(12) United States Patent
Gurevitz et al.

(10) Patent No.: US 10,892,914 B2
(45) Date of Patent: Jan. 12, 2021

(54) APPARATUS, SYSTEM AND METHOD OF A WIRELESS COMMUNICATION RECEIVER

(71) Applicant: INTEL CORPORATION, Santa Clara, CA (US)

(72) Inventors: Assaf Gurevitz, Ramat Hasharon (IL); Oren Kaidar, Binyamina (IL); Rafi Ben-Tal, Yokneam (IL); Elad Meir, Ramat Gan (IL); Hagay Barel, Kiriat Bialik (IL)

(73) Assignee: INTEL CORPORATION, Santa Clara, CA (US)

( * ) Notice: Subject to any disclaimer, the term of this patent is extended or adjusted under 35 U.S.C. 154(b) by 49 days.

(21) Appl. No.: 16/233,395

(22) Filed: Dec. 27, 2018

(65) Prior Publication Data

US 2019/0132154 A1    May 2, 2019

(51) Int. Cl.
| | |
|---|---|
| H04W 4/00 | (2018.01) |
| H04L 23/02 | (2006.01) |
| H04L 27/00 | (2006.01) |
| H04L 27/14 | (2006.01) |
| H04W 76/00 | (2018.01) |
| H04B 1/00 | (2006.01) |
| H04W 52/50 | (2009.01) |
| H04L 5/00 | (2006.01) |

(52) U.S. Cl.
CPC ............ H04L 23/02 (2013.01); H04B 1/00 (2013.01); H04L 27/0008 (2013.01);
(Continued)

(58) Field of Classification Search
CPC ... H04L 5/0007; H04L 23/02; H04L 27/0008; H04L 27/0012; H04L 27/14;
(Continued)

(56) References Cited

U.S. PATENT DOCUMENTS 7,116,259 B2 * 10/2006 Garlapati .............. H03M 1/002
                                                                341/155
7,418,246 B2 *  8/2008 Kim .................... H04L 27/0008
                                                                340/3.21
(Continued)

OTHER PUBLICATIONS

IEEE Std 802.11™-2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

*Primary Examiner* — Frank Duong
(74) *Attorney, Agent, or Firm* — Shichrur & Co.

(57) ABSTRACT

For example, a wireless communication receiver may be configured to switch one or more RF components of the receiver between an on-state and an off-state based on at least one detection criterion for preamble detection of a frame preamble by a preamble detector of the receiver, switching the one or more RF components between the on-state and the off-state including switching the one or more RF components from the on-state to the off-state based on determination that the at least one detection criterion is not met, and switching the one or more RF components from the off-state to the on-state after an off-state period, wherein a duration of the off-state period is based at least on a preamble duration of the frame preamble; and to repeat switching the one or more RF components between the on-state and the off-state until the frame preamble is detected by the preamble detector.

25 Claims, 10 Drawing Sheets

(52) U.S. Cl.
CPC .......... *H04L 27/0012* (2013.01); *H04L 27/14* (2013.01); *H04W 52/50* (2013.01); *H04W 76/00* (2013.01); *H04L 5/0007* (2013.01)

(58) Field of Classification Search
CPC .......... H04L 27/2613; H04L 27/2666; H04W 28/02; H04W 52/0229; H04W 52/288; H04W 52/50; H04W 88/02
See application file for complete search history.

(56) References Cited

U.S. PATENT DOCUMENTS

| | | | | |
|---|---|---|---|---|
| 7,466,667 | B2* | 12/2008 | Jones, IV | H04W 28/16 370/278 |
| 7,480,234 | B1* | 1/2009 | Hart | H04L 27/2662 370/208 |
| 8,085,806 | B2* | 12/2011 | Boer | H04W 74/0825 370/445 |
| 9,900,193 | B2* | 2/2018 | Schmidl | H04L 27/0012 |
| 10,333,750 | B2* | 6/2019 | de Ruijter | H04L 27/2017 |
| 2006/0146869 | A1* | 7/2006 | Zhang | H04W 28/20 370/465 |
| 2006/0199558 | A1* | 9/2006 | Chiodini | H04B 1/7075 455/234.1 |
| 2006/0203926 | A1* | 9/2006 | Chiodini | H04L 27/2666 375/260 |
| 2011/0255642 | A1* | 10/2011 | Nagai | H03G 3/3068 375/345 |
| 2012/0114025 | A1* | 5/2012 | Gauthier | H04B 7/0811 375/219 |
| 2014/0204837 | A1* | 7/2014 | Park | H04L 27/2613 370/328 |

* cited by examiner

APPARATUS, SYSTEM AND METHOD OF A WIRELESS COMMUNICATION RECEIVER

TECHNICAL FIELD

Embodiments described herein generally relate to a wireless communication receiver.

BACKGROUND

A wireless communication receiver, e.g., a WiFi receiver, may operate in a listen mode, at which the receiver may search for a received packet.

Power consumption during the listen mode may be reduced compared to a power consumption during a receive mode, e.g., for data symbol demodulation. However, the receiver may spend much more time in the listen mode compared to time spent for data symbol demodulation.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
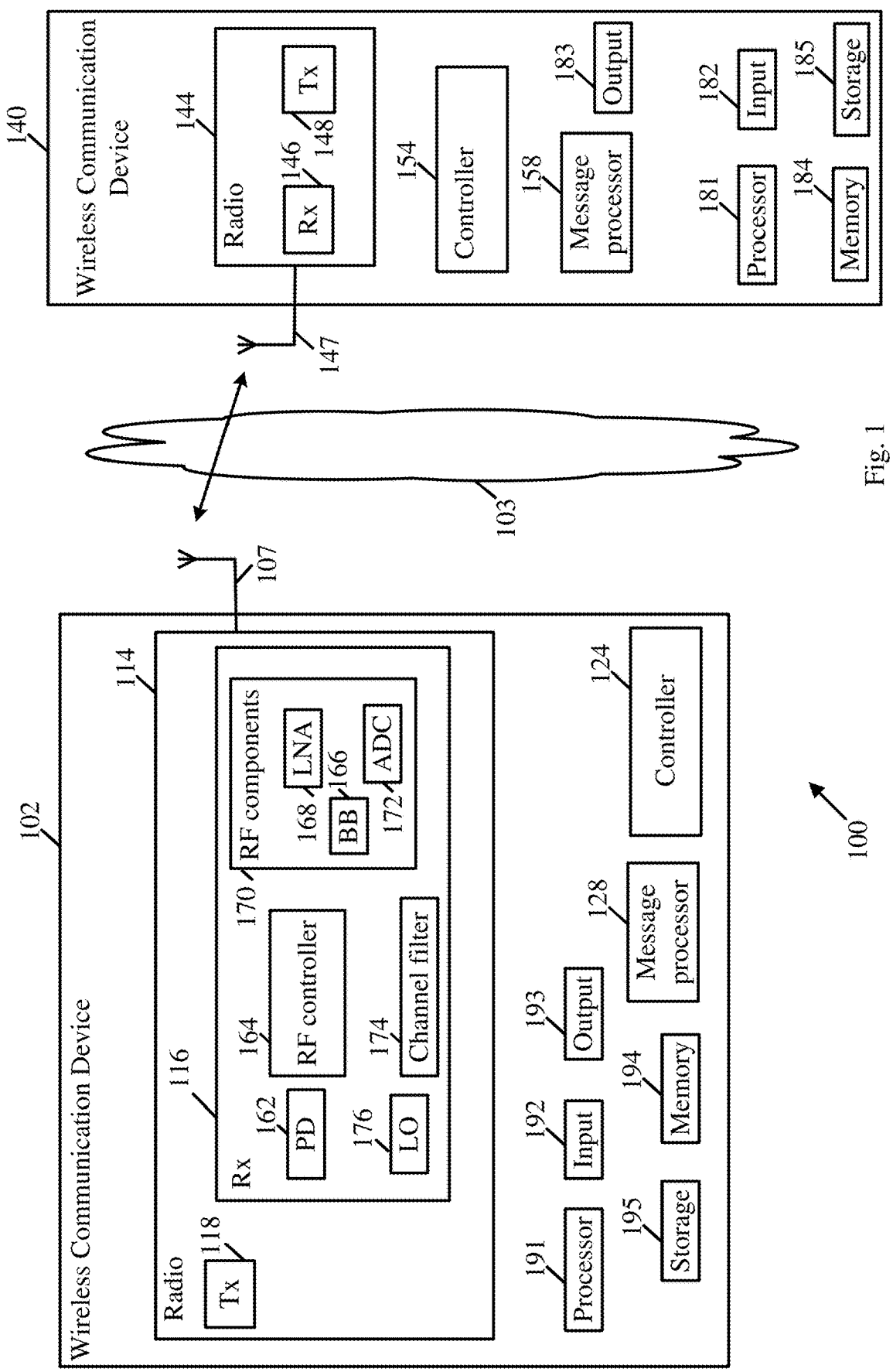
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications*, Dec. 7, 2016)) and/or future versions and/or derivatives thereof, devices and/or networks operating in accordance with existing WFA Peer-to-Peer (P2P) specifications (*WiFi P2P technical specification, version 1.7, Jul. 6, 2016*) and/or future versions and/or derivatives thereof, devices and/or networks operating in accordance with existing cellular specifications and/or protocols, e.g., 3rd Generation Partnership Project (3GPP), 3GPP Long Term Evolution (LTE)

and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), Extended GPRS, Code-Division Multiple Access (CDMA), Wideband CDMA (WCDMA), CDMA 2000, single-carrier CDMA, multi-carrier CDMA, Multi-Carrier Modulation (MCM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE Advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz, or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102 and/or 140.

In some demonstrative embodiments, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102 and/or 140 may include, operate as, and/or perform the functionality of one or more STAs. For example, device 102 may include at least one STA, and/or device 140 may include at least one STA.

In some demonstrative embodiments, devices 102 and/or 140 may include, operate as, and/or perform the functionality of one or more WLAN STAs.

In some demonstrative embodiments, devices 102 and/or 140 may include, operate as, and/or perform the functionality of one or more Wi-Fi STAs.

In some demonstrative embodiments, devices 102 and/or 140 may include, operate as, and/or perform the functionality of one or more BT devices.

In some demonstrative embodiments, devices 102 and/or 140 may include, operate as, and/or perform the functionality of one or more Neighbor Awareness Networking (NAN) STAs.

In some demonstrative embodiments, device 102 may include, operate as, and/or perform the functionality of an AP STA e.g., as described below.

In some demonstrative embodiments, device 102 may include, operate as, and/or perform the functionality of a non-AP STA, e.g., as described below.

For example, the AP may include a router, a PC, a server, a Hot Spot and/or the like.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a WiFi channel, an IR channel, a Bluetooth (BT) channel, and the like.

In some demonstrative embodiments, wireless communication medium 103 may include a 2.4 GHz frequency band or a 5 GHz frequency band, a millimeterWave (mmWave) frequency band, e.g., a 60 GHz frequency band, a Sub-1 GHz (S1G) band, and/or any other frequency band.

In some demonstrative embodiments, devices 102 and/or 140 may include one or more radios including circuitry and/or logic to perform wireless communication between devices 102, and/or 140 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a 2.4 GHz band, a 5 GHz band, an mmWave band, a S1G band, and/or any other band.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, at least part of the functionality of controller 124 may be implemented as part of one or more elements of radio 114, and/or at least part of the functionality of controller 154 may be implemented as part of one or more elements of radio 144.

In other embodiments, one or more functionalities of controller 124 may be implemented as part of any other element of device 102, and/or one or more functionalities of controller 154 may be implemented as part of any other element of device 140.

In some demonstrative embodiments, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 128 may be configured to perform any other additional or alternative functionality and/or may include any other additional or alternative components to generate and/or process a message to be transmitted.

In some demonstrative embodiments, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, a MAC Protocol Data Unit (MPDU); at least one second component configured to convert the message into PHY Protocol Data Unit (PPDU), e.g., a PLCP PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 158 may be configured to perform any other additional or alternative functionality and/or may include any other additional or alternative components to generate and/or process a message to be transmitted.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, one or more functionalities of message processor 128 may be implemented as part of any other element of device 102, and/or one or more functionalities of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a SoC. In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include, operate as, perform the role of, and/or perform one or more functionalities of, one or more STAs. For example, device 102 may include at least one STA, and/or device 140.

In some demonstrative embodiments, wireless communication devices 102 and/or 140 may form, or may communicate as part of, a wireless local area network (WLAN).

In some demonstrative embodiments, wireless communication devices 102 and/or 140 may form, or may communicate as part of, a WiFi network.

In other embodiments, wireless communication devices 102 and/or 140 may form, and/or communicate as part of, any other additional or alternative network.

In some demonstrative embodiments, a wireless communication receiver, for example, a WiFi receiver, e.g., receiver 116, may be configured to operate at a listen mode, at which the receiver may search for a packet or a frame preamble.

In some demonstrative embodiments, during the listen mode, one or more components of the receiver, e.g., an RF receiver, a digital front-end, and/or a preamble detector, may be active.

In some demonstrative embodiments, a power consumption of receiver 116 during the listen mode may be reduced, e.g., compared to a power consumption of receiver 116 during data symbol demodulation.

In some demonstrative embodiments, in some use cases, e.g., over long periods of time, receiver 116 may spend much more time in the listen mode compared to time spent during the data symbol demodulation.

In some demonstrative embodiments, in some use cases, the power consumption of receiver 116 during the listen mode may have a substantial influence on an overall power consumption of receiver 116. Therefore, it may be advantageous to reduce or minimize the power consumption of receiver 116, e.g., at least during the listen mode.

In some demonstrative embodiments, the power consumption of receiver 116 during the listen mode may be a significant power Key Performance Indicator (KPI) in some use cases, e.g., as described below.

In some demonstrative embodiments, the power consumption of receiver 116 during the listen mode may have a substantial influence on a total power consumption of receiver 116 in many WiFi use cases, for example, sporadic traffic, e.g., background traffic including mail synchronization, discovery, and the like, and/or in other use cases such as web browsing and/or the like.

In some demonstrative embodiments, the power consumption of receiver 116 during the listen mode may have a substantial influence on a total power consumption of receiver 116, for example, in congested environments, in which an increased time may be spent in the listen mode, e.g., due to collisions.

In some demonstrative embodiments, device 102 may be configured to implement and/or support a power-save scheme, which may significantly reduce the power consumption of receiver 116, for example, during the listen mode, e.g., as described below.

In some demonstrative embodiments, receiver 116 may be configured according to the power-save scheme, which may result, for example, in a reduction of more than 50% of a total power consumption of receiver 116, e.g., as described below. In other embodiments, other levels of reduction in the power consumption may be achieved.

In some demonstrative embodiments, in some use cases, implementations and/or scenarios, it may not be efficient and/or effective to set a low power mode for a Low Noise Amplifier (LNA), e.g., before a preamble is detected, since, for example, such a setting may result in an increased noise level.

In some demonstrative embodiments, in some use cases, implementations and/or scenarios, it may not be efficient and/or effective to set a low power mode for an Analog to Digital Converter (ADC) with reduced dynamic range, e.g., as described below.

In some demonstrative embodiments, in some use cases, implementations and/or scenarios, it may not be efficient and/or effective to clock gate one or more portions of a digital front end, and/or a preamble detector, while keeping an operational input power estimator, and activating the clock gated blocks only after the power rises above a threshold.

In some demonstrative embodiments, in some use cases, implementations and/or scenarios, it may not be efficient and/or effective to switch a receiver to a Low Intermediate Frequency (Low-IF) using only a single mixer and an ADC. For example, such a scheme may degrade sensitivity and/or an adjacent channel rejection of the receiver.

In some demonstrative embodiments, in some use cases, implementations and/or scenarios, it may not be efficient and/or effective to use long sleep and awake periods, e.g., as used in a scanning mechanism, for example, to allow a receiver to be awake only a part of the time. For example, such a scheme may result in a higher probability to miss packets, e.g., when the receiver is not available over a channel.

In some demonstrative embodiments, the solutions described above may incur a sensitivity degradation, e.g., in preamble detection and/or in data symbol demodulation.

In some demonstrative embodiments, RF and analog blocks of a receiver, e.g., in the solutions described above, may consume power continuously, even in low power or a low performance setting.

In some demonstrative embodiments, device 102 may be configured to implement and/or support a power-save scheme, which may include for example, switching off RF circuits of receiver 116, for example, at a certain duty cycle, e.g., as described below.

In some demonstrative embodiments, switching off the RF circuits of receiver 116 according to a duty cycle may allow to accomplish a significant reduction in the power consumption of receiver 116, for example, while incurring a negligible performance degradation or even not incurring a performance degradation.

In some demonstrative embodiments, device 102 may be configured to implement and/or support a time slotted mode of operation (also referred to as a "Slotted Rx" or a "switching scheme"), at which a receiver, e.g., receiver 116, may scan for an incoming signal, for example, using a low power consumption and/or low performance degradation, for example, compared to conventional receivers, e.g., as described below.

In some demonstrative embodiments, device 102 may be configured to implement and/or support a switching scheme, e.g., a very fast on/off switching scheme, in which RF and/or digital components of receiver 116 may be switched on and off intermittently, for example, while still being able to detect a packet and successfully demodulate a payload of the packet, for example, even without reducing a probability of missing a packet, for example, due to long sleep/awake periods, e.g., as described below.

In some demonstrative embodiments, a significant reduction in power consumption may be achieved, for example, as a result of turning off the RF components of the receiver, e.g., compared to solutions in which the RF components of the receiver are not switched off.

In some demonstrative embodiments, implementing the switching scheme during the listen mode may achieve, for example, a power consumption reduction of at least 50%, for example, with a marginal sensitivity degradation, and even up to 85% or more, for example, with a higher sensitivity degradation, e.g., as described below.

In some demonstrative embodiments, device 102 may be configured to combine the switching scheme with one or more static power saving methods, e.g., one or more of the solutions described above, and/or other solutions.

In some demonstrative embodiments, the switching scheme may be configured to support reception of wireless OFDM signals, for example, in accordance with one or more IEEE 802.11 Standards.

In some demonstrative embodiments, the switching scheme may be configured to support reception of wireless Complementary Code Keying (CCK) signals, e.g., in accordance with an IEEE 802.11 Standard.

In one example, a same preamble detection algorithm may be implemented, e.g., in parallel, for example, to support detection of the OFDM signals and/or the CCK signals.

In some demonstrative embodiments, device 102 may be configured to implement a switching scheme to switch or more RF components 170 of receiver 116 between an on-state and an off-state one, e.g., as described below In some demonstrative embodiments, the switching scheme may include switching the one or more RF components 170 of receiver 116 between the on-state and the off-state, for example, based on one or more detections schemes, e.g., as described below.

In some demonstrative embodiments, the switching scheme may include switching the one or more RF components 170 of receiver 116 between the on-state and the off-state, for example, based on an energy detection and/or a preamble detection, e.g., as described below.

In some demonstrative embodiments, the energy detection may include one or more power measurement detections, e.g., as described below.

In some demonstrative embodiments, a first power detection, e.g., a high-bandwidth and low latency power measurement, may be implemented to detect wideband signals, and/or may be located and/or performed after an Analog to DC Converter (ADC) of receiver 116, e.g., as described below.

In some demonstrative embodiments, a second power detection, e.g., a low-bandwidth and medium latency power measurement, may be implemented to detect a primary channel bandwidth, and/or may be located and/or performed after filtering of a wireless signal to a primary channel bandwidth, e.g., as described below.

In some demonstrative embodiments, the second power measurement may be more accurate, for example, compared to the first power measurement, e.g., if the second power measurement is not affected by adjacent interferers and/or wide band noises.

In some demonstrative embodiments, device 102 may be configured to implement a switching scheme to switch the one or more RF components 170 of receiver 116 between an on-state and an off-state, for example, according to an energy detection criterion and/or a preamble detection criterion, e.g., as described below.

In some demonstrative embodiments, receiver 116 may include an RF controller 164 configured to switch the one or more RF components 170 of receiver 116 between the on-state and the off-state, e.g., as described below.

In some demonstrative embodiments, RF controller 164 may include, or may be implemented, partially or entirely, by circuitry and/or logic, e.g., one or more processors including circuitry and/or logic, memory circuitry and/or logic, Physical Layer (PHY) circuitry and/or logic, baseband (BB) circuitry and/or logic, a BB processor, a BB memory, and/or any other circuitry and/or logic, which may be configured to perform the functionality of RF controller 164, respectively.

In some demonstrative embodiments, at least part of the functionality of RF controller 164 may be implemented, for example, as part of one or more elements of controller 124.

In other embodiments, one or more functionalities of RF controller 164 may be implemented as part of any other element of receiver 116 or device 102.

In some demonstrative embodiments, RF controller 164 may include a digital RF controller 164.

In other embodiments, RF controller 164 may include any other RF controller.

In some demonstrative embodiments, RF controller 164 may be configured to switch the one or more RF components 170 of receiver 116 between the on-state and the off-state, for example, during a Receive (Rx) listening state of receiver 116, e.g., as described below.

In some demonstrative embodiments, the one or more RF components 170 may include at least a Low Noise Amplifier (LNA) 168, an ADC 172, and/or one or more analog Baseband (BB) components 166.

In some demonstrative embodiments, the one or more analog BB components 166 may include, for example, a BB filter, a BB amplifier, and/or any other BB components.

In some demonstrative embodiments, the one or more RF components 170 may include any other additional and/or alternative RF components, modules, and/or elements.

In some demonstrative embodiments, RF controller 164 may be configured to trigger, cause, instruct and/or control receiver 116 to switch the one or more RF components 170 of the receiver 116 between an on-state and an off-state, for example, based on at least one detection criterion for preamble detection of a frame preamble by a Preamble Detector (PD) 162 of the receiver 116, e.g., as described below.

In some demonstrative embodiments, RF controller 164 may be configured to trigger, cause, instruct and/or control receiver 116 to maintain one or more other components of receiver 116, e.g., at least an RF Local Oscillator (LO) 176 of receiver 116 and/or any other components of receiver 116, operative, for example, when the one or more RF components 170 are at the off-state, e.g., as described below.

In some demonstrative embodiments, RF controller 164 may be configured to trigger, cause, instruct and/or control receiver 116 to switch the one or more RF components 170 between the on-state and the off-state, for example, by switching the one or more RF components 170 from the on-state to the off-state, for example, based on determination that the at least one detection criterion is not met, and by switching the one or more RF components 170 from the off-state to the on-state, for example, after an off-state period, e.g., as described below.

In some demonstrative embodiments, a duration of the off-state period may be based, for example, on a preamble duration of the frame preamble and/or a detection duration of the preamble detection by the preamble detector 162, e.g., as described below.

In some demonstrative embodiments, the duration of the off-state period may be based, for example, on a post-detection duration of one or more post-detection operations on the frame preamble, e.g., as described below.

In some demonstrative embodiments, the duration of the off-state period may be based, for example, on a predefined minimal duration of a portion of the frame preamble for the preamble detection by the preamble detector 162, e.g., as described below.

In other embodiments, the duration of the off-state period may be based on any other additional or alternative parameter and/or criterion.

In some demonstrative embodiments, RF controller 164 may be configured to trigger, cause, instruct and/or control receiver 116 to repeat switching the one or more RF components 170 of receiver 116 between the on-state and the off-state, for example, until the frame preamble is detected by the preamble detector 162, e.g., as described below.

In some demonstrative embodiments, the detection criterion may include a power detection criterion corresponding to a detected signal power, for example, when the one or more RF components 170 are at the on-state, e.g., as described below.

In some demonstrative embodiments, RF controller 164 may be configured to trigger, cause, instruct and/or control receiver 116 to switch the one or more RF components 170 from the on-state to the off-state, for example, based on determination that the detected signal power is not greater than a power threshold, e.g., as described below.

In some demonstrative embodiments, the detection criterion may include a pre-filtering signal power, e.g., prior to a channel filter 174 of receiver 116, e.g., as described below.

In some demonstrative embodiments, channel filter 174 may include at least a primary channel filter configured to filter a wireless communication primary channel for reception of wireless communication signals at receiver 116, e.g., as described below.

In some demonstrative embodiments, RF controller 164 may be configured to trigger, cause, instruct and/or control receiver 116 to detect a pre-filtering signal power prior to the channel filter 174 of receiver 116, for example, when the one or more RF components 170 are at the on-state, e.g., as described below.

In some demonstrative embodiments, RF controller 164 may be configured to trigger, cause, instruct and/or control receiver 116 to switch the one or more RF components 170 from the on-state to the off-state, for example, based on determination that the pre-filtering signal power is not greater than a pre-filtering power threshold, e.g., as described below.

In some demonstrative embodiments, the detection criterion may include a post-filtering signal power after the channel filter 174 of receiver 116, e.g., as described below.

In some demonstrative embodiments, RF controller 164 may be configured to trigger, cause, instruct and/or control receiver 116 to detect a post-filtering signal power after the channel filter 174 of receiver 116, for example, when the one or more RF components 170 are at the on-state, e.g., as described below.

In some demonstrative embodiments, RF controller 164 may be configured to trigger, cause, instruct and/or control receiver 116 to switch the one or more RF components 170 of receiver 116 from the on-state to the off-state, for example, based on determination that the post-filtering signal power is not greater than a post-filtering power threshold, e.g., as described below.

In some demonstrative embodiments, RF controller 164 may be configured to trigger, cause, instruct and/or control receiver 116 to switch the one or more RF components 170 of receiver 116 from the on-state to the off-state, for example, when at least one detection criterion of the preamble detection criterion, the pre-filtering signal power, and/or the post-filtering signal power is not met, e.g., as described below.

In some demonstrative embodiments, RF controller 164 may be configured to trigger, cause, instruct and/or control receiver 116 to detect the pre-filtering signal power prior to the channel filter 174 of receiver 116, for example, when the one or more RF components 170 are at the on-state, e.g., as described below.

In some demonstrative embodiments, RF controller 164 may be configured to trigger, cause, instruct and/or control receiver 116 to switch the one or more RF components 170 from the on-state to the off-state, for example, when the pre-filtering signal power is not greater than the pre-filtering power threshold, e.g., as described below.

In some demonstrative embodiments, RF controller 164 may be configured to trigger, cause, instruct and/or control receiver 116 to, when the pre-filtering signal power is greater than the pre-filtering power threshold, detect the post-filtering signal power after the channel filter 174, for example, when the one or more RF components 170 are at the on-state, e.g., as described below.

In some demonstrative embodiments, RF controller 164 may be configured to trigger, cause, instruct and/or control receiver 116 to switch the one or more RF components 170 from the on-state to the off-state, for example, when the post-filtering signal power is not greater than the post-filtering power threshold, e.g., as described below.

In some demonstrative embodiments, RF controller 164 may be configured to trigger, cause, instruct and/or control receiver 116 to, when the post-filtering signal power is greater than the post-filtering power threshold, maintain the one or more RF components 170 at the on-state at least until a result of the preamble detection by the preamble detector 172, e.g., as described below.

In some demonstrative embodiments, the detection criterion may include a preamble detection criterion corresponding to a result of the preamble detection by the preamble detector 162, e.g., as described below.

In some demonstrative embodiments, the preamble detection may include an OFDM preamble detection, e.g., as described below.

In some demonstrative embodiments, RF controller 164 may be configured to trigger, cause, instruct and/or control receiver 116 to perform Direct Current (DC) estimation in parallel to buffering a Short Training Field (STF) for the OFDM preamble detection, e.g., as described below.

In some demonstrative embodiments, RF controller 164 may be configured to trigger, cause, instruct and/or control receiver 116 to perform the OFDM preamble detection based on the STF, and/or to allow a symbol timing detection, for example, based on at least part of a Long Training Field (LTF) subsequent to the STF, e.g., as described below.

In some demonstrative embodiments, the preamble detection may include a CCK preamble detection, e.g., as described below.

In some demonstrative embodiments, RF controller 164 may be configured to trigger, cause, instruct and/or control receiver 116 to switch the one or more RF components 170 to the off-state, for example, based on a determination that a partial CCK preamble processing does not indicate the CCK preamble detection, for example, when the preamble detection includes the CCK preamble detection e.g., as described below.

In other embodiments, the preamble detection may be in accordance with any other modulation technique and/or scheme.

Figure 2:
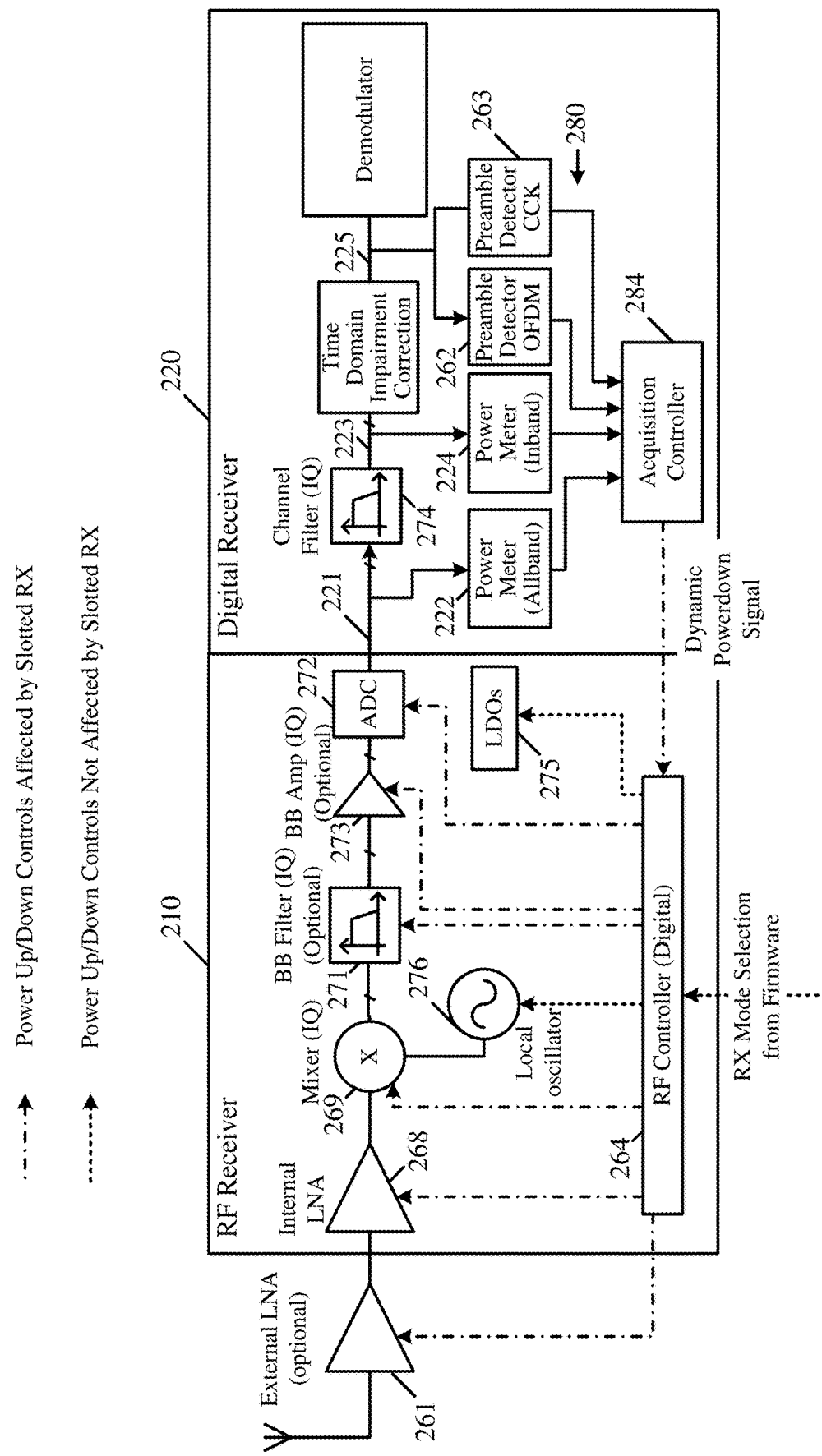
FIG. 2 is a schematic illustration of a receiver, in accordance with some demonstrative embodiments.

Reference is made to FIG. 2, which schematically illustrates a receiver 216, in accordance with some demonstrative embodiments.

In one example, receiver 116 (FIG. 1) may be configured to perform one or more operation of, one or more functionalities of, the role of, and/or the functionality of, receiver 216.

In some demonstrative embodiments, as shown in FIG. 2, receiver 216 may include an RF receiver component 210 and a digital receiver component 220.

In some demonstrative embodiments, as shown in FIG. 2, receiver 216 may include a digital RF controller 264 configured to switch one or more RF components of receiver 216 between an on-state and an off-state, for example, during an Rx listening state of receiver 216.

In some demonstrative embodiments, digital RF controller 264 may be configured to switch between the on-state and the off-state the one or more RF components of receiver 216 including, for example, an external LNA 261, an internal LNA 268, a mixer 269, a BB filter 271, a BB amplifier 273, an ADC 272, and/or one or more additional and/or alternative components.

In some demonstrative embodiments, digital RF controller 264 may be configured to maintain one or more other RF components operative, for example, while the one or more RF components of receiver 216 are at the off-state. For example, digital RF controller 264 may maintain an LO 276, one or more Low-Dropout Linear Regulators (LDOs) 275, and/or any other additional or alternative components of receiver 216, operative, for example, while LNA 261, LNA 268, mixer 269, BB filter 271, BB amplifier 273, and/or ADC 272 are at the off-state.

In some demonstrative embodiments, digital RF controller 264 may be configured to switch the one or more RF components of receiver 216 from the on-state to the off-state, for example, based on a determination that at least one detection criterion 280 is not met, e.g., as described below.

In some demonstrative embodiments, receiver 216 may include an acquisition controller 284 configured to trigger, cause, instruct and/or control digital RF controller 264 to switch the one or more RF components from the on-state to the off-state, for example, based on the determination that the at least one detection criterion 280 is not met, e.g., as described below.

In one example, RF controller 164 (FIG. 1) may be configured to perform one or more operations of, one or more functionalities of, the role of, and/or the functionality of, digital RF controller 264 and/or acquisition controller 284.

In some demonstrative embodiments, receiver 216 may include a first power detector 222 to detect a pre-filtering signal power of a pre-filtering signal 221, e.g., prior to a channel filter 274 of receiver 216, for example, when the one or more RF components are at the on-state, e.g., as described below.

In some demonstrative embodiments, acquisition controller 284 may be configured to trigger, cause, instruct and/or control digital RF controller 264 to switch the one or more RF components from the on-state to the off-state, for example, when the pre-filtering signal power of pre-filtering signal 221 is not greater than a pre-filtering power threshold, e.g., as described below.

In some demonstrative embodiments, receiver 216 may include a second power detector 224 configured to detect a post-filtering signal power of a post-filtering signal 223, e.g., after the channel filter 274 of receiver 216, for example, when the pre-filtering signal power of pre-filtering signal 221 is greater than the pre-filtering power threshold.

In some demonstrative embodiments, acquisition controller 284 may be configured to trigger, cause, instruct and/or control digital RF controller 264 to switch the one or more RF components from the on-state to the off-state, for example, when the post-filtering signal power of post-filtering signal 223 is not greater than a post-filtering power threshold, e.g., as described below.

In some demonstrative embodiments, receiver 216 may include an OFDM preamble detector 262 to detect an OFDM preamble of a signal 225, for example, when the post-filtering signal power of post-filtering signal 223 is greater than the pre-filtering power threshold.

In some demonstrative embodiments, receiver 216 may include a CCK preamble detector 263, e.g., to detect a CCK preamble of a signal 225, for example, when the post-filtering signal power of post-filtering signal 223 is greater than the pre-filtering power threshold.

In some demonstrative embodiments, acquisition controller 284 may be configured to trigger, cause, instruct and/or control digital RF controller 264 to maintain the one or more RF components at the on-state, for example, at least until a result of the preamble detection by OFDM preamble detector 262 or CCK preamble detector 263, e.g., as described below.

In some demonstrative embodiments, acquisition controller 284 may be configured to trigger, cause, instruct and/or control digital RF controller 264 to switch the one or more RF components from the on-state to the off-state, for example, when a result of OFDM preamble detector 262 or a result of CCK preamble detector 263 indicates that a preamble is not detected.

Figure 3:
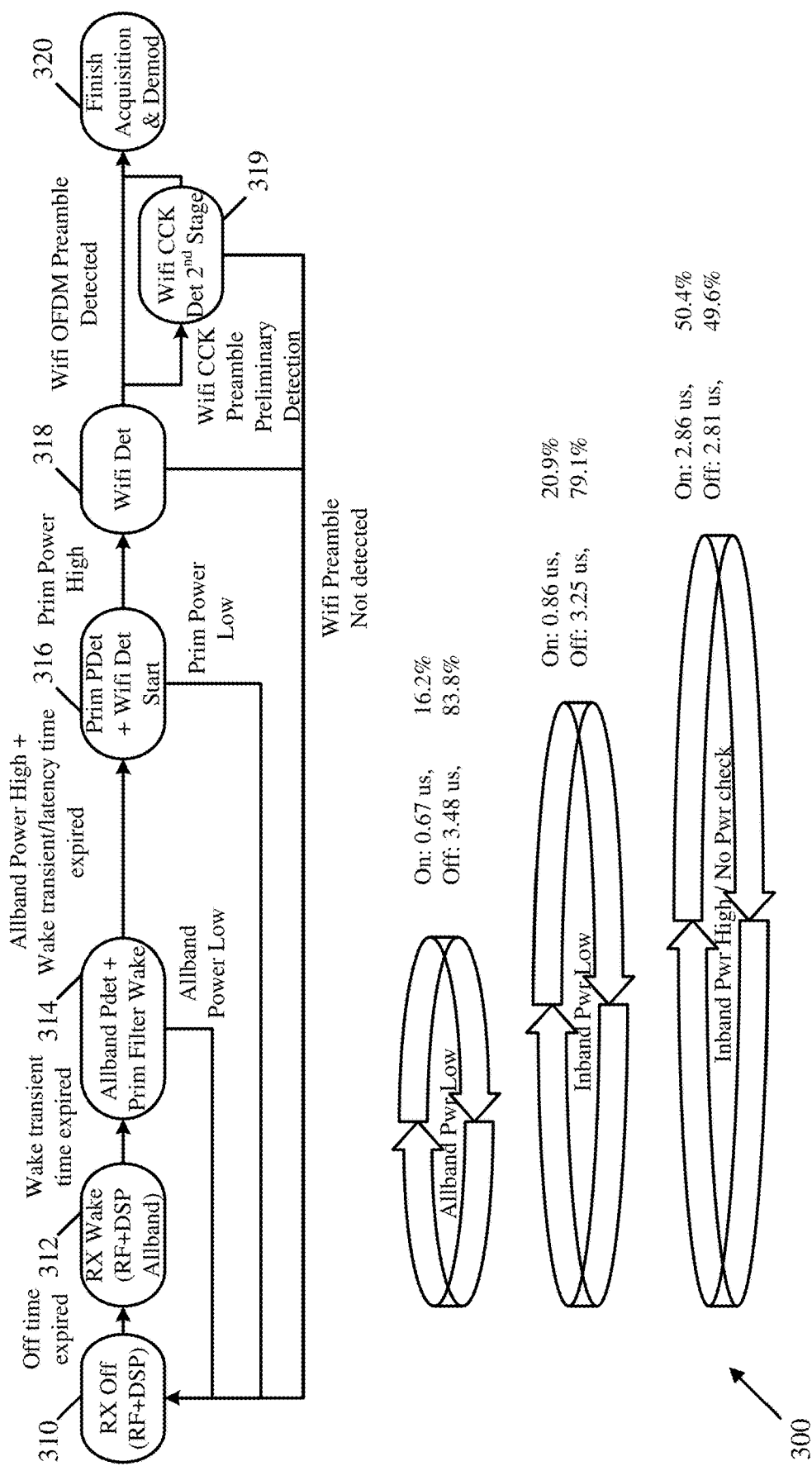
FIG. 3 is a schematic illustration of a detection procedure, in accordance with some demonstrative embodiments.

Reference is made to FIG. 3, which schematically illustrates a detection procedure 300, in accordance with some demonstrative embodiments.

In one example, one or more of the operations of detection procedure 300 may be performed by one or more elements of a receiver, e.g., receiver 116 (FIG. 1) and/or receiver 216 (FIG. 2).

In some demonstrative embodiments, as shown in FIG. 3, detection procedure 300 may include an initial state 310 (Rx off), at which one or more components of a receiver, e.g., RF components 170 (FIG. 1), are turned off, e.g., are at the off-state.

In some demonstrative embodiments, as shown in FIG. 3, detection procedure 300 may include a state 312 (Rx Wake), at which the one or more components of the receiver are turned on, e.g., to an RX Wake state, for example, according to a duty cycle, e.g., a short duty cycle.

In some demonstrative embodiments, during state 312 other RF components, e.g., RF components, which cannot be switched between the on-state and the off-state in the short duty cycle, may remain statically on.

In one example, RF and Front-End components, such as, for example, LNA 168 (FIG. 1), ADC 172 (FIG. 1), and/or analog BB components 166 (FIG. 1), may be switched on and off at states 310 and 312, for example, while a Phase Locked Loop (PLL) component of receiver 116 (FIG. 1) and/or LO 176 (FIG. 1) may remain operative.

In some demonstrative embodiments, as shown in FIG. 3, detection procedure 300 may include a state 314 (also referred to as "all band", e.g., a wideband, power detector (Pdet) ("Allband Pdet") state), at which the receiver may detect wideband signals, for example, by power detector 222 (FIG. 2), e.g., according to a high-bandwidth and a low latency power measurement.

In some demonstrative embodiments, the receiver may return to state 310, for example, if no signal is detected at state 314. In one example, this operation may yield a first duty cycle, for example, of about ~85% of the RX-off state.

In other embodiments, another mode of operation may be implemented, e.g., instead of the power detection state 314, for example, by using different duty cycles for power detector 222 (FIG. 2).

In some demonstrative embodiments, as shown in FIG. 3, detection procedure 300 may include a state 316 (also referred to as "Primary Channel Power Detector (Prim Pdet)"), at which the receiver may detect power in a signal at an output of a digital filtering chain, e.g., at an output of channel filter 274 (FIG. 2), that filters a Primary channel, e.g., a primary 20 MHz channel, for example, when power is detected at state 314.

In some demonstrative embodiments, the power detection at state 316 may be more accurate, e.g., compared to power detection at state 314, for example, when adjacent and/or other wide band noises are filtered out.

In some demonstrative embodiments, the receiver may return to state 310, for example, if no signal is detected at state 316. In one example, this operation may yield a second duty cycle, for example, of about ~80% of the RX-off state.

In some demonstrative embodiments, returning to state 310, for example, after state 316, may provide a better power estimate at a price of a lower duty cycle, e.g., compared to the operations at state 314.

In some demonstrative embodiments, as shown in FIG. 3, detection procedure 300 may include a state 318 (also referred to as wireless Preamble Detection (WiFi Det)), at which the receiver detects a frame preamble.

In some demonstrative embodiments, the receiver may be configured to attempt to detect an OFDM preamble at state 318.

In some demonstrative embodiments, during state 318, OFDM preamble detector 262 (FIG. 2) may remain operative, e.g., until it finishes a first detection period.

In some demonstrative embodiments, the receiver may be configured to attempt to detect a CCK preamble at state 318.

In some demonstrative embodiments, at state 318, CCK preamble detector 263 (FIG. 2) may remain operative, e.g., until a detection decision is made on the CCK preamble.

In some demonstrative embodiments, the CCK preamble detection may include at least two detection stages, for example, including a preliminary CCK preamble detection stage, and a full preamble detection stage, e.g., as described below.

In some demonstrative embodiments, at state 318, a determination may be made, e.g., by CCK preamble detector 263 (FIG. 2), on whether a partial CCK preamble processing indicates or does not indicate a CCK preamble detection.

In some demonstrative embodiments, detection procedure 300 may include a state 319 (also referred to as wireless CCK Detection (WiFi CCK)), at which the receiver may attempt to detect the CCK frame preamble, e.g., based on a full preamble detection, for example, when the partial CCK preamble is detected at state 318.

In some demonstrative embodiments, the preliminary CCK preamble detection may be shorter than a full CCK preamble detection and/or may be configured for a high false detection rate, e.g. a false detection rate of above 10%.

For example, false detections by the CCK preamble detector may result in RF, FE and/or digital blocks on the receiver to be activated for a few more microseconds, and, accordingly, a power consumption reduction may be slightly degraded.

In some demonstrative embodiments, the receiver may return to state 310, for example, if no frame preamble is detected during state 318. In one example, this operation may yield a third duty cycle, for example, of about ~50% of the RX-off state.

In other embodiments, the third duty cycle may be configurable to yield any other duty cycle.

In some demonstrative embodiments, as shown in FIG. 3, detection procedure 300 may include a state 320 (also referred to as "Finish Acquisition and Demodulation (Demod)"), at which the receiver may finish acquisition and demodulation to detect the frame preamble, for example, if the frame preamble is detected at state 318 or at state 319.

In one example, if an OFDM preamble detector, e.g., OFDM preamble detector 262 (FIG. 2) declares detection, e.g., at state 318, the receiver may proceed to state 320, at which RF and Digital circuits of the receiver may be switched on, e.g., until a modem exits the Rx-listen mode or a packet fails to demodulate.

In another, if a CCK preamble detector, e.g., CCK preamble detector 263 (FIG. 2), declares a preliminary CCK preamble detection, e.g., at state 318, the operation of the CCK preamble detector may be extended to perform full preamble detection, e.g., at state 319, and the receiver may proceed to state 320, for example, if the full preamble is detected at state 319. Otherwise, e.g., if the CCK preamble is not detected at state 318 or at state 319, the receiver may deactivate the RF and digital blocks and may return to state 310.

In some demonstrative embodiments, when the receiver returns to state 310, e.g., the Rx-off state, a counter may be applied to measure a time until a next phase of Rx-On occurs, e.g., state 312.

In some demonstrative embodiments, there may be a tradeoff between a duty cycle and a sensitivity of a receiver, e.g., receiver 116 (FIG. 1), to detect received frames, e.g., as described below.

In one example, operating the receiver according to the first duty cycle, e.g., at about an 85% duty cycle, for example, while using a wide bandwidth power estimator and/or a certain threshold to proceed to the next state, may result in a reduction of the sensitivity of the receiver. For example, the sensitivity may be reduced, for example, due to a noise power, which may influence a determination on whether or not a detected signal power is greater than a power threshold. In addition, a modem may be more sensitive to adjacent interferers, e.g., that may not be filtered in this state, which may also reduce the sensitivity of the receiver.

In another example, operating the receiver according to the third duty cycle, e.g., at about a 50% duty cycle, for example, based on the preamble detection criterion, may result in an increased sensitivity of the receiver, e.g., compared to the sensitivity of the receiver at the first duty cycle, which may be, in some cases, more suitable for practical operation in one or more use cases.

In another example, operating the receiver according to the second duty cycle, e.g., at about a 50% duty cycle, for example, detect a post-filtering signal power after the channel filter, may result in a reduction of the sensitivity of the receiver, e.g., compared to the sensitivity of the receiver at the first duty cycle, for example, due to a reduced noise power, which may influence the determination on whether or not a detected signal power is greater than a power threshold. However, the sensitivity of the receiver may be higher, e.g., compared to the sensitivity of the receiver at the third duty cycle, which may have a negligible effect on sensitivity.

Figure 4:
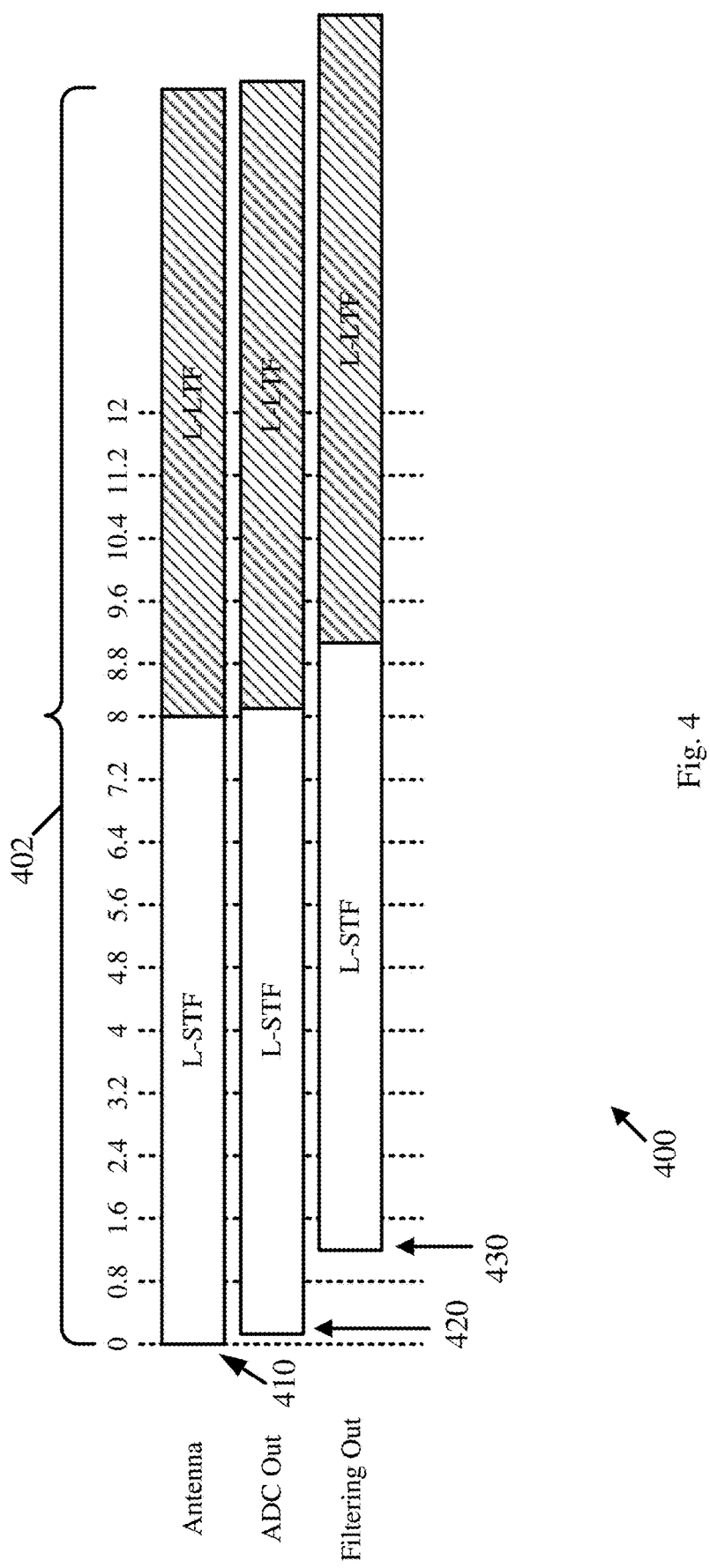
FIG. 4 is a schematic timing diagram of preamble processing, in accordance with some demonstrative embodiments.

Reference is made to FIG. 4, which schematically illustrates a timing diagram 400 of preamble processing, in accordance with some demonstrative embodiments.

In some demonstrative embodiments, a receiver, e.g., receiver 116 (FIG. 1), may be configured to process a frame preamble 402, for example, according to timing diagram 400.

In some demonstrative embodiments, as shown in FIG. 4, at an initial time, e.g., at a zero timestamp, a beginning of frame preamble 402 may be received at an antenna of the receiver.

In some demonstrative embodiments, as shown in FIG. 4, at a first timestamp 410, the beginning of frame preamble 402 may be output by an ADC of the receiver, e.g., ADC 172 (FIG. 1).

In some demonstrative embodiments, as shown in FIG. 4, at a second timestamp 420, the beginning of the frame preamble 402 may be output by a channel filter of the receiver, e.g., channel filter 174 (FIG. 1).

Figure 5:
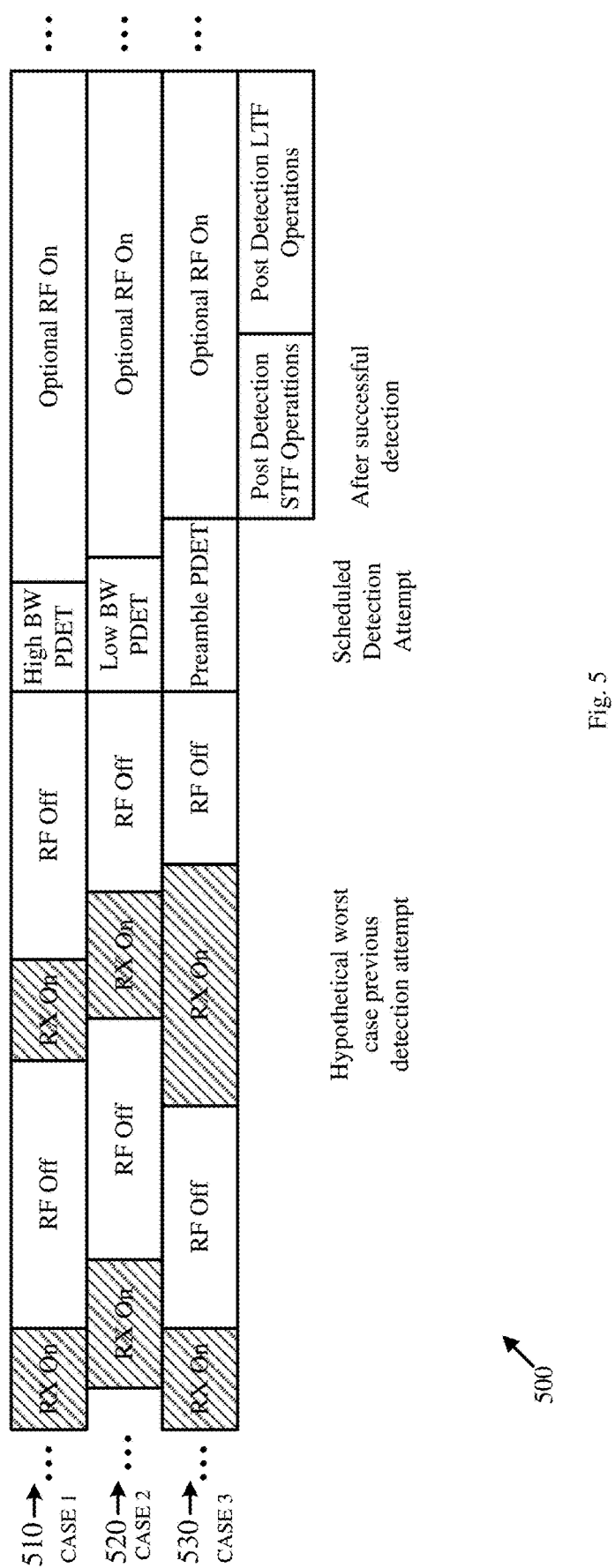
FIG. 5 is a schematic timing diagram of three duty cycles, in accordance with some demonstrative embodiments.

Reference is made to FIG. 5, which schematically illustrates a timing diagram 500 of three duty cycles, in accordance with some demonstrative embodiments.

In one example, the duty cycles according to timing diagram 500 may be implemented with respect to an OFDM signal. In another example, the duty cycles according to timing diagram may be implemented with respect to a CCK signal.

In some demonstrative embodiments, as shown in FIG. 5, a first duty-cycle 510, e.g., an all-band low duty cycle, may be based, for example, on detection of a pre-filtering signal power prior to a channel filter, e.g., a high bandwidth power measurement, e.g., as described above. The duty cycle 510 may result, for example, in a power-on ratio of about ~15%, e.g., when the high bandwidth power measurement did not detect a signal, for example, if a pre-filtering signal power is not greater than a pre-filtering power threshold.

In some demonstrative embodiments, as shown in FIG. 5, a second duty-cycle 520, e.g., an inband low duty cycle, may be based, for example, on detection of a post-filtering signal power after the channel filter, e.g., as described above. The duty cycle 520 may result, for example, in a power-on ratio of about ~20%, e.g., when the high bandwidth power measurement passes the pre-filtering power threshold, and a low bandwidth power measurement does not pass a post-filtering power threshold.

In some demonstrative embodiments, as shown in FIG. 5, a third duty-cycle 530, e.g., an in band high duty cycle, may be based, for example, on detection of a frame preamble, e.g., as described above. For example, duty cycle 530 may result in a power-on ratio of about ~50%, e.g., when the high bandwidth power measurement passes the pre-filtering power threshold, and the low bandwidth power measurement passes the post-filtering power threshold.

In some demonstrative embodiments, the duty cycle 530 may result in a duty cycle of about ~50%, for example, based on usage of preamble detector algorithms, e.g., for WiFi or CCK signals, which require a longer period compared, for example, to power detection methods for power on detection.

In one example, a performance degradation of a receiver, e.g., receiver 116 (FIG. 1), may be based, for example, at least on a duty cycle and/or a power threshold implemented by the receiver, e.g., as follows:

TABLE 1

| Mode | Degradation in Decibels (dB) |
| --- | --- |
| Slotted Aggressive - 80% power off | 1.5 |
| Slotted - 50% power off | 0.5 |

In one example, the slotted aggressive mode may correspond to the duty-cycle 520 (FIG. 5), e.g., when power measurement is performed on a filtered signal and the receiver proceeds to a detection state, e.g., state 318 (FIG. 3), for example, only when passing the threshold.

In some demonstrative embodiments, the slotted mode may correspond to duty-cycle 530 (FIG. 5), e.g., when power thresholds are ignored or not implemented, and the detection is based on the preamble detection criterion. In one example, the WiFi det state 318 (FIG. 3) or CCK detection state 319 (FIG. 3) may be switched to the OFF state 310 (FIG. 3) at a 50% duty cycle.

In some demonstrative embodiments, as shown in Table 1, when a receiver operates according to the slotted mode, e.g., according to duty-cycle 530, the performance degradation may be negligence, e.g., 0.5 dB.

Figure 6:
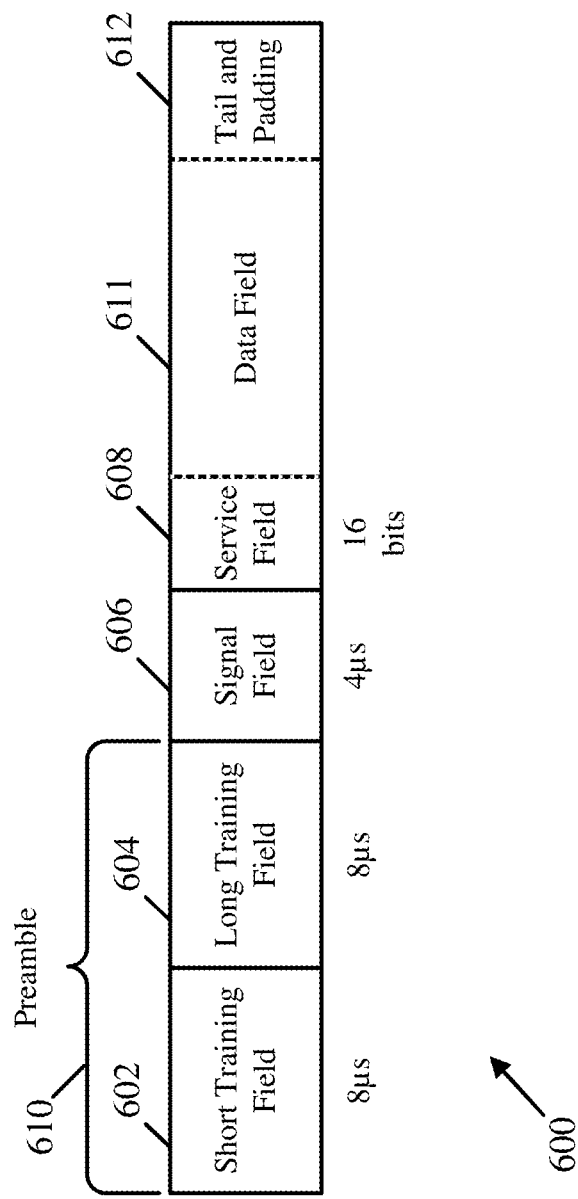
FIG. 6 is a schematic illustration of a structure of an Orthogonal-Frequency-Division Multiplexing (OFDM) packet, which may be implemented in accordance with some demonstrative embodiments.

Reference is made to FIG. 6, which schematically illustrates a structure of an OFDM packet 600, which may be implemented in accordance with some demonstrative embodiments.

In some demonstrative embodiments, a receiver, e.g., the receiver 116 (FIG. 1) of device 102 (FIG. 1), may be configured to switch one or more RF components, for example, the one or more RF components 170 (FIG. 1), between the on-state and the off-state based, for example, on at least one detection criterion for an OFDM preamble detection, for example, of OFDM packet 600, e.g., as described below.

In some demonstrative embodiments, as shown in FIG. 6, OFDM packet 600 may include a preamble 610 including a Short Training Field (STF) 602 and an LTF 604, e.g., after STF 602.

In some demonstrative embodiments, as shown in FIG. 6, OFDM packet 600 may include one or more fields, e.g., including a Signal (Sig) field 606, a Service field 608, a data field 611, and/or a Tail and Padding 612, e.g., following the preamble 610.

Figure 7:
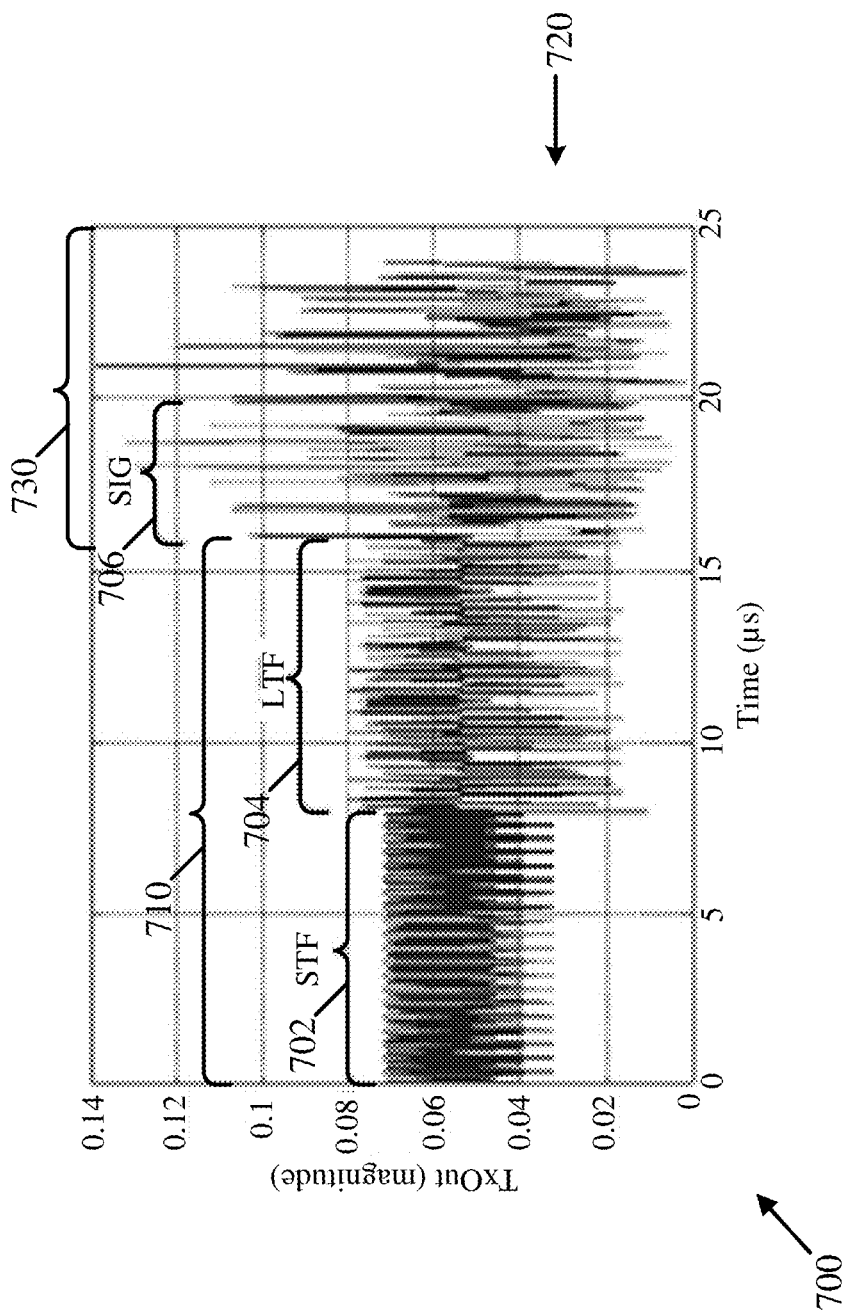
FIG. 7 is a schematic illustration of a graph depicting a power of an OFDM signal over time, in accordance with some demonstrative embodiments.

Reference is made to FIG. 7, which schematically illustrates a graph 700 depicting a power of an OFDM signal 702 over time, in accordance with some demonstrative embodiments.

In some demonstrative embodiments, the power of OFDM signal 702 may correspond to the structure of OFDM packet 600 (FIG. 6).

In some demonstrative embodiments, as shown in FIG. 7, OFDM signal 720 may include a signal portion 710 corresponding to preamble 610 (FIG. 1), and a signal portion 730 corresponding to one or more post-preamble fields. For example, signal portion 710 may include an STF portion 702, e.g., corresponding to STF 602 (FIG. 6), and an LTF portion 704, e.g., corresponding to LTF 604 (FIG. 6); and signal portion 730 may include a signal portion 706 corresponding to Sig field 606 (FIG. 6). For example, as shown in FIG. 7, signal portion 710 may have a duration of about 16 microseconds (usec).

In some demonstrative embodiments, a receiver, e.g., receiver 116 (FIG. 1), may be configured to search for a periodicity pattern of STF portion 702, e.g., using autocorrelation techniques, for example, as part of a scan operation of the receiver.

In some demonstrative embodiments, one or more operations, for example, to adjust an RF gain and/or to perform DC estimation and cancellation, may be performed, for example, before and/or after detection of STF portion 702.

In some demonstrative embodiments, symbol timing may be determined, for example, for accurate demodulation performance, e.g., after detection of STF portion 702.

In some demonstrative embodiments, a receiver, e.g., receiver 116 (FIG. 1), may be configured to perform the DC estimation, e.g., as descried below.

In some demonstrative embodiments, the receiver may perform the DC estimation, for example, in parallel to buffering STF signal 702 for example, for the OFDM preamble detection, e.g., of preamble signal 710.

In some demonstrative embodiments, the receiver may be configured to perform the OFDM preamble detection, for example, based on STF signal 702 and may allow a symbol timing detection, for example, based on at least part of LTF signal 704 (FIG. 7), e.g., as described below.

In one example, DC estimation operations may consume several hundreds of nanoseconds from the STF 702, e.g., in some typical receiver configurations.

In some demonstrative embodiments, symbol-timing algorithms to detect an end of the STF 602 (FIG. 6), e.g., based on signal portion 702, may consume, for example, over 1.5 microseconds (us) of the STF. Therefore, it may be advantageous to perform the DC estimation in parallel to a buffering of the STF, e.g., by an OFDM Autocorrelation detector.

In one example, a cross correlation algorithm may be implemented, for example, instead of or in addition to, a symbol-timing algorithm. For example, the cross correlation algorithm may be based on cross correlation with expected LTF symbols. For example, the cross correlation algorithm may be accompanied by symbol timing refinement, for example, based on Cyclic Prefix (CP) position detection of one or more first OFDM symbols.

In some demonstrative embodiments, RF and digital receiver blocks, e.g., of receiver 116, may be turned off for a longer duration of time, for example, as the duration of the STF signal required for acquisition may be reduced, e.g., by the above improvements to support using the LTF portion.

Figure 8:
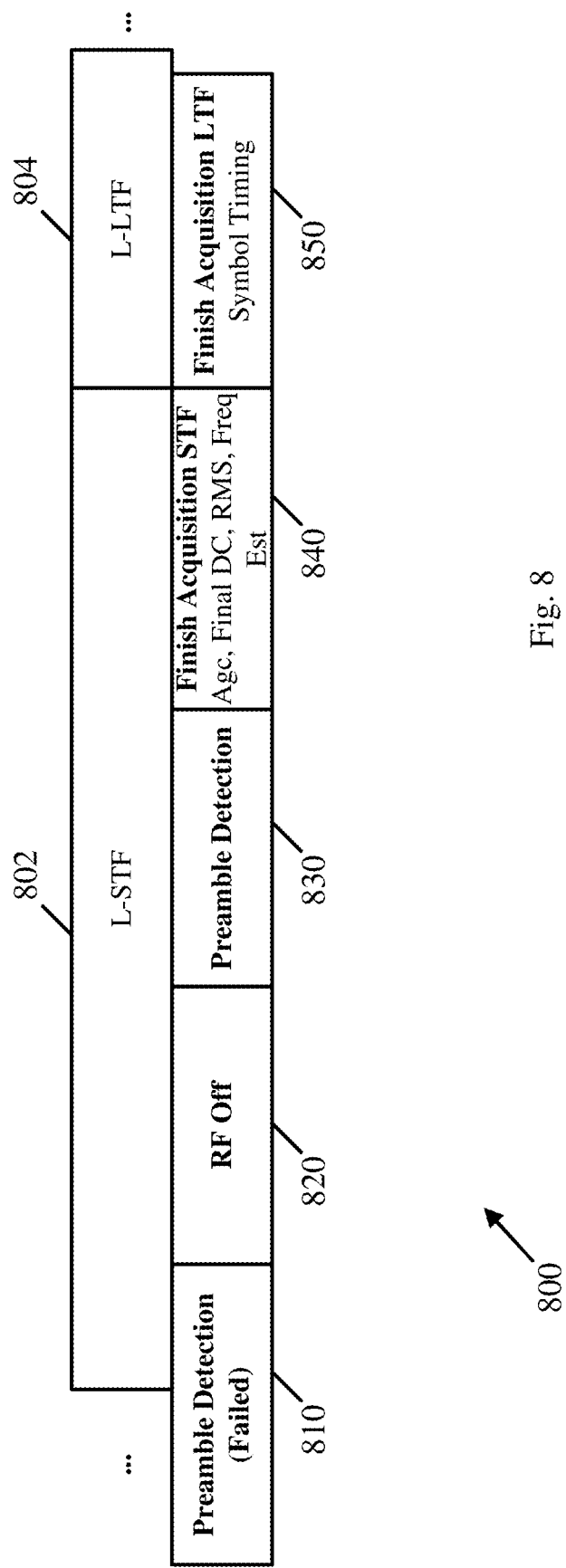
FIG. 8 is a schematic illustration of a detection scheme for detection of a frame preamble, in accordance with some demonstrative embodiments.

Reference is made to FIG. 8, which schematically illustrates a detection scheme 800 for detection of a frame preamble, in accordance with some demonstrative embodiments.

In some demonstrative embodiments, as shown in FIG. 8, the frame preamble may include an STF 802 and an LTF 804.

In some demonstrative embodiments, as shown in FIG. 8, a receiver, e.g., receiver 116 (FIG. 1), may switch one or more RF components of the receiver, e.g., RF components 170 (FIG. 1), between an on-state 810 and an off-state 820.

In some demonstrative embodiments, as shown in FIG. 8, during on-state 810 the receiver may attempt to detect the frame preamble, e.g., based on the L-STF 802.

In some demonstrative embodiments, as shown in FIG. 8, the receiver may switch from the on-state 810 to the off-state 820, for example, if the attempt to detect the frame preamble is not successful.

In some demonstrative embodiments, as shown in FIG. 8, after the off-state 820, the receiver may switch again to an on-state 830, at which the receiver may detect the frame preamble, for example, based on STF 802.

In some demonstrative embodiments, as shown in FIG. 8, the receiver may finish an acquisition 840 of the STF 802.

In some demonstrative embodiments, as shown in FIG. 8, the receiver may perform a symbol timing detection 850, for example, based on at least part of LTF 804.

Referring back to FIG. 1, in some demonstrative embodiments, receiver 116 may implement a duration of an off-state period and/or a duration of an on-state period for switching the one or more RF components 170 from between off-state and the on-state, e.g., as described below.

In some demonstrative embodiments, a duration of the off-state period, denoted T_RF_Off may be based on one or more on-state durations of operations during the on-state period, e.g., as described below.

In some demonstrative embodiments, the on-state durations may include a duration, denoted T_Det_X, which includes one or more operations corresponding to a detection, denoted X, wherein X denotes a preamble detector, e.g., a WiFi OFDM preamble detector, a CCK preamble detector or any other preamble detector, or a power detector, e.g., a pre-filter or a post-filter power detector. For example, the duration T_Det_X may include, one or more, e.g., some or all, of the following durations:

RF Wake up and output stabilization time;
Digital filtering and processing latency from ADC output to detector input;
Time for operations required to adapt incoming signal to detector requirements, e.g., coarse RF or digital gain control, dc cancellation and the like;
Time from detector activation to a first valid result from detector.

In one example, the duration T_Det_X may include a sum of the RF Wake up and output stabilization time, the Digital filtering and processing latency from ADC output to detector input, the time for operations required to adapt incoming signal to detector requirements, and the time from detector activation to a first valid result from detector.

In some demonstrative embodiments, the on-state durations may include a post-detection of one or more post-detection operations in the frame preamble.

In some demonstrative embodiments, the post-detection duration may include a duration, denoted T_PostDet_X, which includes time for one or more operations on the first field of a preamble, e.g., L-STF for WiFi OFDM, of an incoming packet after the preamble was detected. The operation may be implemented, for example, for successful demodulation of the incoming packet. The operations may include one or more, e.g., some or all, of the following:

Final analog or digital gain control;
Power estimation;
DC estimation and cancellation;
Frequency estimation;
Symbol timing estimation, and more,
wherein X denotes a type of a preamble detector or a detected packet type, e.g., if detection of more than one packet is possible.

In some demonstrative embodiments, the on-state durations may include a duration, denoted T_Preamble_1_X, which includes a time of a first field of the preamble, which may be used to detect a preamble of type X, e.g., L-STF for WiFi OFDM, or SYNC field for WiFi DSSS/CCK.

In some demonstrative embodiments, the on-state durations may include a duration, denoted T_Powerdown, which includes Time from decision to turn off the one or more RF component to reaching the off-state. In one example, this time may be negligible.

In some demonstrative embodiments, the duration of the off-state period T_RF_Off, may be determined, e.g., as follows:

$$T\_RF\_Off = T\_preamble\_1 - T\_PostDet - T\_Det\_Preamble \quad (1)$$

In some demonstrative embodiments, determining the duration of the off-state period, e.g., according to Equation 1, may be based, for example, on an assumption that if a preamble started arriving while the detector was already open, the preamble may be detected. However, this assumption may not always be true.

In some demonstrative embodiments, device 102 may determine the duration of the off-state period, for example, based at least on the predefined minimal duration of a portion of the frame preamble for the preamble detection by the preamble detector, e.g., as described below.

In one example, the predefined minimal duration, denoted T_Min_Det_X, may include a minimal duration of a preamble signal reaching the preamble detector that would guarantee detection within a predetermined probability. The notation X in T_Min_Det_X may refer to a detector, e.g., preamble detector or a power detector, for example, since even when using a power detector its goal may be to distinguish between a power of a preamble and a power of a thermal noise or an ambient interference.

In some demonstrative embodiments, the predefined minimal duration may depend on an SNR.

In one example, operation of a preamble detector may take, for example, 1 usec, and the preamble may start only in the second half of the duration. According to this example, the preamble detector may still be able to detect the preamble, for example, if a signal quality is high, or to miss detection of the preamble, for example, if the signal quality is low.

In some demonstrative embodiments, the predefined minimal duration may be defined, for example, as a contribution to a misdetection probability, e.g., in low SNR, which may affect a sensitivity of detection. Therefore, the predefined minimal duration may determine a sensitivity degradation of the receiver, e.g., due to misdetection at the beginning of the preamble.

In some demonstrative embodiments, the duration of the off-state period T_RF_Off, may be determined, e.g., as follows:

$$T\_RF\_Off\_X = T\_preamble\_1 - T\_PostDet - T\_Det\_Preamble - T\_Min\_Det\_X \quad (2)$$

wherein X denotes a detector, which its determination is used for the decision to turn-off the one or more components of the RF.

In some demonstrative embodiments, it may be assumed, that if the detector determined there is no preamble, then up to the predefined minimal duration T_Min_Det_X of the preamble may have already arrived but was not detected by the detector.

In some demonstrative embodiments, an RF duty cycle of the receiver may be determined, e.g., as follows:

$$(T\_Det\_X + T\_Powerdown)/(T\_Det\_X + T\_RF\_Off\_X + T\_Powerdown) \quad (3)$$

In one example, one or more values may be applied to the predefined minimal duration T_Det_X and/or to the duration T_PostDet_X, for example, based on implementation, configuration, whether or not analog gain changes are required, and/or any other criterion.

In some demonstrative embodiments, controller 164 may control receiver 116 to turn off the one or more RF components 170 based on a negative result from a detector, for example, a power detector or a preamble detector, e.g., as described above.

In some demonstrative embodiments, the duration of the off-period may be retrieved from a register, e.g., specific to the type of the detector being used for the decision whether or not to switch off the RF components 170. In one example, this duration can be written to the register, e.g., by firmware, for example, during integration.

In one example, one or more parameters for determining the duration of the off-period may be defined, e.g., as follows:

$T\_Det\_PreambleOfdm = 2.9$ us

[There's another scenario to consider that has smaller T_Det_PreambleOfdm, but we may assume worst case]

$T\_PostDet\_PreambleOfdm = 2.3$ us $T\_Preamble\_1\_Ofdm = 8$ us $T\_Powerdown = 0$

[powerdown and powerup times could be different for specific RF components, so it is clearer to use T_Powerdown=0 and has T_Det_X include the max of all power up times]

$T\_Det\_PwrPreFilter = 0.7$ $T\_Min\_Det\_PwrPreFilter = 0.1$ $T\_RF\_Off \text{ PreFilter} = 8 - 2.3 - 2.9 - 0.1 = 2.7$ us $RF \text{ On PreFilter } \% = 0.7/(2.7 + 0.7) = 20\%$ $T\_Det\_PwrPostFilter = 0.85$ $T\_Min\_Det\_PwrPostFilter = 0.25$ $T\_RF\_Off \text{ PostFilter} = 8 - 2.3 - 2.9 - 0.25 = 2.55$ us $RF \text{ On PostFilter } \% = 0.85/(2.55 + 0.85) = 25\%$ In one example, e.g., for an OFDM preamble, values for the duration T_PostDet and the predefined minimal duration T_Min_Det, may be determined, for example, according to two cases, e.g., as follows:

according to a first case, if a signal power is weak, and a preamble cannot be detected by power detection, for example, no need to spend time in post detection for gain control and resulting transient:

$T\_PostDet\_PreambleOfdm\_NoTransient = 1.1$ us $T\_Min\_Det\_PreambleOfdm = 1.7$ $T\_RF\_Off = 8 - 1.1 - 2.9 - 1.7 = 2.3$ us according to a second case, if a signal power is stronger, a power detector may determine a preamble is starting, and may avoid turning off the RF components. A T_Min_Det_PwrPostFilter may be used, e.g., instead of T_Min_Det_PreambleOfdm, and a T_PostDet_PreambleOfdm:

$T\_RF\_Off = 8 - 2.3 - 2.9 - 0.25 = 2.55$ us

In some demonstrative embodiments, a minimal value for the off-state period T_RF_Off of the two cases may be selected, e.g., to support weak or strong signals, which may yield a duty cycle of about 55%, e.g., as follows:

$$RF\text{ On PreambleDet }\% = 2.9/(2.9+2.3) = 55\% \quad (4)$$

Figure 9:
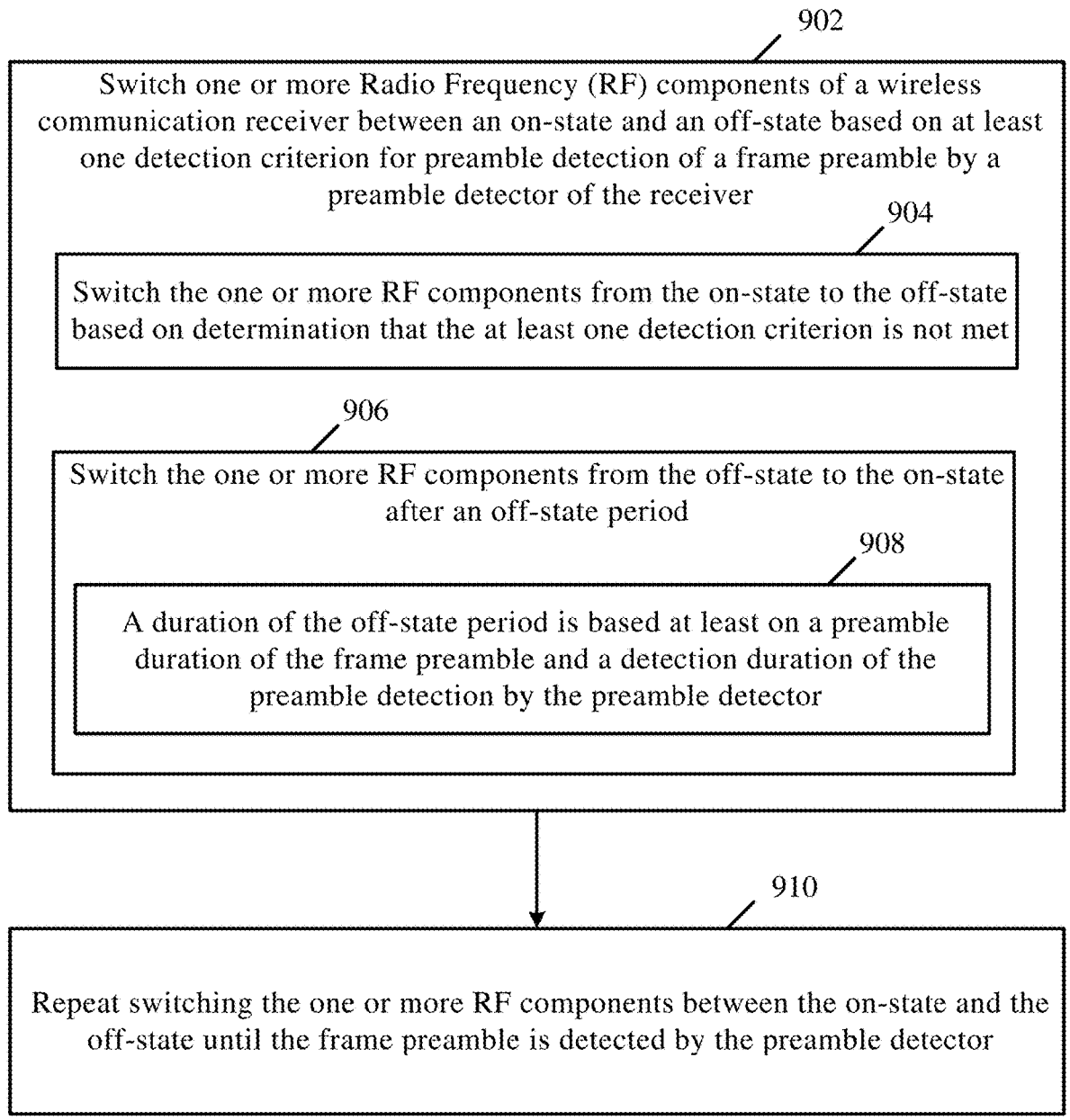
FIG. 9 is a schematic flow-chart illustration of a method of a wireless communication receiver, in accordance with some demonstrative embodiments.

Reference is made to FIG. 9, which schematically illustrates a method of a wireless communication receiver, in accordance with some demonstrative embodiments. For example, one or more of the operations of the method of FIG. 9 may be performed by one or more elements of a system, e.g., system 100 (FIG. 1), for example, one or more wireless devices, e.g., device 102 (FIG. 1) and/or device 140 (FIG. 1), a controller, e.g., RF controller 164 (FIG. 1), and/or controller 124 (FIG. 1), a radio, e.g., radio 114 (FIG. 1), a receiver, e.g., receiver 116 (FIG. 1) and/or receiver 200 (FIG. 2), and/or a message processor, e.g., message processor 128 (FIG. 1).

As indicated at block 902, the method may include switching one or more RF components of a wireless communication receiver between an on-state and an off-state based on at least one detection criterion for preamble detection of a frame preamble by a preamble detector of the receiver. For example, controller 164 (FIG. 1) may be configured to trigger, cause, instruct and/or control receiver 116 (FIG. 1) to switch the one or more RF components 170 (FIG. 1) between the on-state and the off-state based on the detection criterion for preamble detection of the frame preamble by the preamble detector 162 (FIG. 1), e.g., as described above.

As indicated at block 904, switching the one or more RF components of the receiver may include switching the one or more RF components from the on-state to the off-state based on determination that the at least one detection criterion is not met. For example, RF controller 164 (FIG. 1) may be configured to trigger, cause, instruct and/or control receiver 116 (FIG. 1) to switch the one or more RF components 170 (FIG. 1) from the on-state to the off-state based on the determination that the at least one detection criterion is not met, e.g., as described above.

As indicated at block 906, switching the one or more RF components of the receiver may include switching the one or more RF components from the off-state to the on-state after an off-state period. For example, RF controller 164 (FIG. 1) may be configured to trigger, cause, instruct and/or control receiver 116 (FIG. 1) to switch the one or more RF components 170 (FIG. 1) from the off-state to the on-state after the off-state period, e.g., as described above.

As indicated at block 908, switching the one or more RF components from the off-state to the on-state may include switching the one or more RF components from the off-state to the on-state after an off-state period having a duration, which is based at least on a preamble duration of the frame preamble and a detection duration of the preamble detection by the preamble detector, e.g., as described above.

As indicated at block 910, the method may include repeating switching the one or more RF components between the on-state and the off-state, for example, until the frame preamble is detected by the preamble detector. For example, RF controller 164 (FIG. 1) may be configured to trigger, cause, instruct and/or control receiver 116 (FIG. 1) to repeat switching the one or more RF components 170 (FIG. 1) between the on-state and the off-state, for example, until the frame preamble is detected by the preamble detector 162 (FIG. 1), e.g., as described above.

Figure 10:
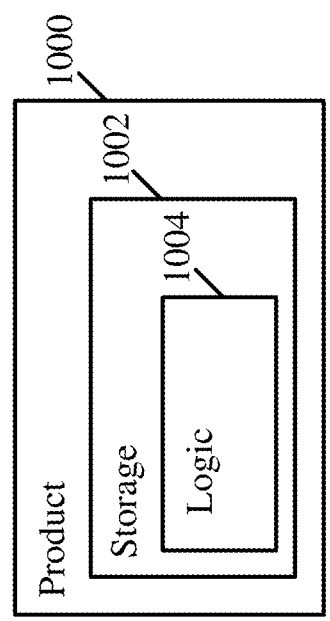
FIG. 10 is a schematic illustration of a product of manufacture, in accordance with some demonstrative embodiments.

Reference is made to FIG. 10, which schematically illustrates a product of manufacture 1000, in accordance with some demonstrative embodiments. Product 1000 may include one or more tangible computer-readable ("machine-readable") non-transitory storage media 1002, which may include computer-executable instructions, e.g., implemented by logic 1004, operable to, when executed by at least one computer processor, enable the at least one computer processor to implement one or more operations at device 102 (FIG. 1), radio 114 (FIG. 1), receiver 116 (FIG. 1), controller 124 (FIG. 1), RF controller 164 (FIG. 1), and/or message processor 128 (FIG. 1), to cause device 102 (FIG. 1), radio 114 (FIG. 1), receiver 116 (FIG. 1), controller 124 (FIG. 1), RF controller 164 (FIG. 1) to perform, trigger and/or implement one or more operations and/or functionalities, and/or to perform, trigger and/or implement one or more operations and/or functionalities described with reference to the FIGS. 1, 2, 3, 4, 5, 6, 7, 8, and/or 9, and/or one or more operations described herein. The phrases "non-transitory machine-readable medium" and "computer-readable non-transitory storage media" may be directed to include all computer-readable media, with the sole exception being a transitory propagating signal.

In some demonstrative embodiments, product 1000 and/or machine-readable storage media 1002 may include one or more types of computer-readable storage media capable of storing data, including volatile memory, non-volatile memory, removable or non-removable memory, erasable or non-erasable memory, writeable or re-writeable memory, and the like. For example, machine-readable storage media 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless communication receiver to switch one or more Radio Frequency (RF) components of the receiver between an on-state and an off-state based on at least one detection criterion for preamble detection of a frame preamble by a preamble detector of the receiver, switching the one or more RF components between the on-state and the off-state comprising switching the one or more RF components from the on-state to the off-state based on determination that the at least one detection criterion is not met, and switching the one or more RF components from the off-state to the on-state after an off-state period, wherein a duration of the off-state period is based at least on a preamble duration of the frame preamble and a detection duration of the preamble detection by the preamble detector; and repeat switching the one or more RF components between the on-state and the off-state until the frame preamble is detected by the preamble detector.

Example 2 includes the subject matter of Example 1, and optionally, wherein the at least one detection criterion comprises a power detection criterion corresponding to a detected signal power when the one or more RF components are at the on-state, wherein switching the one or more RF components from the on-state to the off-state comprises switching the one or more RF components from the on-state to the off-state based on determination that the detected signal power is not greater than a power threshold.

Example 3 includes the subject matter of Example 2, and optionally, wherein the apparatus is configured to cause the receiver to detect a pre-filtering signal power prior to a channel filter of the receiver when the one or more RF components are at the on-state, and to switch the one or more RF components from the on-state to the off-state based on determination that the pre-filtering signal power is not greater than a pre-filtering power threshold.

Example 4 includes the subject matter of Example 2 or 3, and optionally, wherein the apparatus is configured to cause the receiver to detect a post-filtering signal power after a channel filter of the receiver when the one or more RF components are at the on-state, and to switch the one or more RF components from the on-state to the off-state based on determination that the post-filtering signal power is not greater than a post-filtering power threshold.

Example 5 includes the subject matter of Example 3 or 4, and optionally, wherein the channel filter comprises a primary channel filter to filter a wireless communication primary channel for reception of wireless communication signals at the receiver.

Example 6 includes the subject matter of any one of Examples 1-5, and optionally, wherein the at least one detection criterion comprises a preamble detection criterion corresponding to a result of the preamble detection by the preamble detector.

Example 7 includes the subject matter of any one of Examples 1-6, and optionally, wherein the apparatus is configured to cause the receiver to detect a pre-filtering signal power prior to a channel filter of the receiver when the one or more RF components are at the on-state; when the pre-filtering signal power is not greater than a pre-filtering power threshold, switch the one or more RF components from the on-state to the off-state; when the pre-filtering signal power is greater than the pre-filtering power threshold, detect a post-filtering signal power after the channel filter when the one or more RF components are at the on-state; when the post-filtering signal power is not greater than a post-filtering power threshold, switch the one or more RF components from the on-state to the off-state; and when the post-filtering signal power is greater than the post-filtering power threshold, maintain the one or more RF components at the on-state at least until a result of the preamble detection by the preamble detector.

Example 8 includes the subject matter of any one of Examples 1-7, and optionally, wherein the one or more RF components comprise at least a Low Noise Amplifier (LNA), an Analog to Digital Converter (ADC), and one or more analog Baseband (BB) components.

Example 9 includes the subject matter of any one of Examples 1-8, and optionally, wherein the duration of the off-state period is based at least on a post-detection duration of one or more post-detection operations on the frame preamble.

Example 10 includes the subject matter of any one of Examples 1-9, and optionally, wherein the duration of the off-state period is based at least on a predefined minimal duration of a portion of the frame preamble for the preamble detection by the preamble detector.

Example 11 includes the subject matter of any one of Examples 1-10, and optionally, wherein the preamble detection comprises an Orthogonal-Frequency-Division-Multiplexing (OFDM) preamble detection.

Example 12 includes the subject matter of Example 11, and optionally, wherein the apparatus is configured to cause the receiver to perform Direct Current (DC) estimation in parallel to buffering a Short Training Field (STF) for the OFDM preamble detection.

Example 13 includes the subject matter of Example 11 or 12, and optionally, wherein the apparatus is configured to cause the receiver to perform the OFDM preamble detection based on a Short Training Field (STF), and to allow a symbol timing detection based on at least part of a Long Training Field (LTF) subsequent to the STF.

Example 14 includes the subject matter of any one of Examples 1-10, and optionally, wherein the preamble detection comprises a Complementary Code Keying (CCK) preamble detection.

Example 15 includes the subject matter of Example 14, and optionally, wherein the apparatus is configured to cause the receiver to switch the one or more RF components to the off-state based on a determination that a partial CCK preamble processing does not indicate the CCK preamble detection.

Example 16 includes the subject matter of any one of Examples 1-15, and optionally, wherein the apparatus is configured to cause the receiver to maintain at least an RF local oscillator of the receiver operative when the one or more RF components are at the off-state.

Example 17 includes the subject matter of any one of Examples 1-16, and optionally, comprising a digital RF controller to switch the one or more RF components between the on-state and the off-state during a Receive (Rx) listening state.

Example 18 includes the subject matter of any one of Examples 1-17, and optionally, comprising a memory, a processor, and one or more antennas.

Example 19 includes a system of wireless communication comprising a wireless communication device, the wireless communication device comprising one or more antennas; a memory; a processor; and a radio comprising a wireless communication receiver, the receiver comprising one or more Radio Frequency (RF) components; a preamble detector; and a controller configured to cause the wireless communication receiver to switch the one or more RF components of the receiver between an on-state and an off-state based on at least one detection criterion for preamble detection of a frame preamble by the preamble detector of the receiver, switching the one or more RF components between the on-state and the off-state comprising switching the one or more RF components from the on-state to the off-state based on determination that the at least one detection criterion is not met, and switching the one or more RF components from the off-state to the on-state after an off-state period, wherein a duration of the off-state period is based at least on a preamble duration of the frame preamble and a detection duration of the preamble detection by the preamble detector; and repeat switching the one or more RF components between the on-state and the off-state until the frame preamble is detected by the preamble detector.

Example 20 includes the subject matter of Example 19, and optionally, wherein the at least one detection criterion comprises a power detection criterion corresponding to a detected signal power when the one or more RF components are at the on-state, wherein switching the one or more RF components from the on-state to the off-state comprises switching the one or more RF components from the on-state to the off-state based on determination that the detected signal power is not greater than a power threshold.

Example 21 includes the subject matter of Example 20, and optionally, wherein the controller is configured to cause the receiver to detect a pre-filtering signal power prior to a channel filter of the receiver when the one or more RF components are at the on-state, and to switch the one or more RF components from the on-state to the off-state based on determination that the pre-filtering signal power is not greater than a pre-filtering power threshold.

Example 22 includes the subject matter of Example 20 or 21, and optionally, wherein the controller is configured to cause the receiver to detect a post-filtering signal power after a channel filter of the receiver when the one or more RF components are at the on-state, and to switch the one or more RF components from the on-state to the off-state based on determination that the post-filtering signal power is not greater than a post-filtering power threshold.

Example 23 includes the subject matter of Example 21 or 22, and optionally, wherein the channel filter comprises a primary channel filter to filter a wireless communication primary channel for reception of wireless communication signals at the receiver.

Example 24 includes the subject matter of any one of Examples 19-23, and optionally, wherein the at least one detection criterion comprises a preamble detection criterion corresponding to a result of the preamble detection by the preamble detector.

Example 25 includes the subject matter of any one of Examples 19-24, and optionally, wherein the controller is configured to cause the receiver to detect a pre-filtering signal power prior to a channel filter of the receiver when the one or more RF components are at the on-state; when the pre-filtering signal power is not greater than a pre-filtering power threshold, switch the one or more RF components from the on-state to the off-state; when the pre-filtering signal power is greater than the pre-filtering power threshold, detect a post-filtering signal power after the channel filter when the one or more RF components are at the on-state; when the post-filtering signal power is not greater than a post-filtering power threshold, switch the one or more RF components from the on-state to the off-state; and when the post-filtering signal power is greater than the post-filtering power threshold, maintain the one or more RF components at the on-state at least until a result of the preamble detection by the preamble detector.

Example 26 includes the subject matter of any one of Examples 19-25, and optionally, wherein the one or more RF components comprise at least a Low Noise Amplifier (LNA), an Analog to Digital Converter (ADC), and one or more analog Baseband (BB) components.

Example 27 includes the subject matter of any one of Examples 19-26, and optionally, wherein the duration of the off-state period is based at least on a post-detection duration of one or more post-detection operations on the frame preamble.

Example 28 includes the subject matter of any one of Examples 19-27, and optionally, wherein the duration of the off-state period is based at least on a predefined minimal duration of a portion of the frame preamble for the preamble detection by the preamble detector.

Example 29 includes the subject matter of any one of Examples 19-28, and optionally, wherein the preamble detection comprises an Orthogonal-Frequency-Division-Multiplexing (OFDM) preamble detection.

Example 30 includes the subject matter of Example 29, and optionally, wherein the controller is configured to cause the receiver to perform Direct Current (DC) estimation in parallel to buffering a Short Training Field (STF) for the OFDM preamble detection.

Example 31 includes the subject matter of Example 29 or 30, and optionally, wherein the controller is configured to cause the receiver to perform the OFDM preamble detection based on a Short Training Field (STF), and to allow a symbol timing detection based on at least part of a Long Training Field (LTF) subsequent to the STF.

Example 32 includes the subject matter of any one of Examples 19-28, and optionally, wherein the preamble detection comprises a Complementary Code Keying (CCK) preamble detection.

Example 33 includes the subject matter of Example 32, and optionally, wherein the controller is configured to cause the receiver to switch the one or more RF components to the off-state based on a determination that a partial CCK preamble processing does not indicate the CCK preamble detection.

Example 34 includes the subject matter of any one of Examples 19-33, and optionally, wherein the receiver comprises at least an RF local oscillator of the receiver, the controller configured to maintain the RF local oscillator operative when the one or more RF components are at the off-state.

Example 35 includes the subject matter of any one of Examples 19-34, and optionally, wherein the receiver comprises a digital RF controller to switch the one or more RF components between the on-state and the off-state during a Receive (Rx) listening state.

Example 36 includes a method to be performed at a wireless communication receiver, the method comprising switching one or more Radio Frequency (RF) components of the receiver between an on-state and an off-state based on at least one detection criterion for preamble detection of a frame preamble by a preamble detector of the receiver, switching the one or more RF components between the on-state and the off-state comprising switching the one or more RF components from the on-state to the off-state based on determination that the at least one detection criterion is not met, and switching the one or more RF components from the off-state to the on-state after an off-state period, wherein a duration of the off-state period is based at least on a preamble duration of the frame preamble and a detection duration of the preamble detection by the preamble detector; and repeating switching the one or more RF components between the on-state and the off-state until the frame preamble is detected by the preamble detector.

Example 37 includes the subject matter of Example 36, and optionally, wherein the at least one detection criterion comprises a power detection criterion corresponding to a detected signal power when the one or more RF components are at the on-state, wherein switching the one or more RF components from the on-state to the off-state comprises switching the one or more RF components from the on-state to the off-state based on determination that the detected signal power is not greater than a power threshold.

Example 38 includes the subject matter of Example 37, and optionally, comprising detecting a pre-filtering signal power prior to a channel filter of the receiver when the one or more RF components are at the on-state, and switching the one or more RF components from the on-state to the off-state based on determination that the pre-filtering signal power is not greater than a pre-filtering power threshold.

Example 39 includes the subject matter of Example 37 or 38, and optionally, comprising detecting a post-filtering signal power after a channel filter of the receiver when the one or more RF components are at the on-state, and switching the one or more RF components from the on-state to the off-state based on determination that the post-filtering signal power is not greater than a post-filtering power threshold.

Example 40 includes the subject matter of Example 38 or 39, and optionally, wherein the channel filter comprises a primary channel filter to filter a wireless communication primary channel for reception of wireless communication signals at the receiver.

Example 41 includes the subject matter of any one of Examples 36-40, and optionally, wherein the at least one detection criterion comprises a preamble detection criterion corresponding to a result of the preamble detection by the preamble detector.

Example 42 includes the subject matter of any one of Examples 36-41, and optionally, comprising detecting a pre-filtering signal power prior to a channel filter of the receiver when the one or more RF components are at the on-state; when the pre-filtering signal power is not greater than a pre-filtering power threshold, switching the one or more RF components from the on-state to the off-state; when the pre-filtering signal power is greater than the pre-filtering power threshold, detecting a post-filtering signal power after the channel filter when the one or more RF components are at the on-state; when the post-filtering signal power is not greater than a post-filtering power threshold, switching the one or more RF components from the on-state to the off-state; and when the post-filtering signal power is greater than the post-filtering power threshold, maintaining the one or more RF components at the on-state at least until a result of the preamble detection by the preamble detector.

Example 43 includes the subject matter of any one of Examples 36-42, and optionally, wherein the one or more RF components comprise at least a Low Noise Amplifier (LNA), an Analog to Digital Converter (ADC), and one or more analog Baseband (BB) components.

Example 44 includes the subject matter of any one of Examples 36-43, and optionally, wherein the duration of the off-state period is based at least on a post-detection duration of one or more post-detection operations on the frame preamble.

Example 45 includes the subject matter of any one of Examples 36-44, and optionally, wherein the duration of the off-state period is based at least on a predefined minimal duration of a portion of the frame preamble for the preamble detection by the preamble detector.

Example 46 includes the subject matter of any one of Examples 36-45, and optionally, wherein the preamble detection comprises an Orthogonal-Frequency-Division-Multiplexing (OFDM) preamble detection.

Example 47 includes the subject matter of Example 46, and optionally, comprising performing Direct Current (DC) estimation in parallel to buffering a Short Training Field (STF) for the OFDM preamble detection.

Example 48 includes the subject matter of Example 46 or 47, and optionally, comprising performing the OFDM preamble detection based on a Short Training Field (STF), and allowing a symbol timing detection based on at least part of a Long Training Field (LTF) subsequent to the STF.

Example 49 includes the subject matter of any one of Examples 36-45, and optionally, wherein the preamble detection comprises a Complementary Code Keying (CCK) preamble detection.

Example 50 includes the subject matter of Example 49, and optionally, comprising switching the one or more RF components to the off-state based on a determination that a partial CCK preamble processing does not indicate the CCK preamble detection.

Example 51 includes the subject matter of any one of Examples 36-50, and optionally, comprising maintaining at least an RF local oscillator of the receiver operative when the one or more RF components are at the off-state.

Example 52 includes the subject matter of any one of Examples 36-51, and optionally, comprising switching the one or more RF components between the on-state and the off-state during a Receive (Rx) listening state.

Example 53 includes a product comprising one or more tangible computer-readable non-transitory storage media comprising computer-executable instructions operable to, when executed by at least one processor, enable the at least one processor to cause a wireless communication receiver to switch one or more Radio Frequency (RF) components of the receiver between an on-state and an off-state based on at least one detection criterion for preamble detection of a frame preamble by a preamble detector of the receiver, switching the one or more RF components between the on-state and the off-state comprising switching the one or more RF components from the on-state to the off-state based on determination that the at least one detection criterion is not met, and switching the one or more RF components from the off-state to the on-state after an off-state period, wherein a duration of the off-state period is based at least on a preamble duration of the frame preamble and a detection duration of the preamble detection by the preamble detector; and repeat switching the one or more RF components between the on-state and the off-state until the frame preamble is detected by the preamble detector.

Example 54 includes the subject matter of Example 53, and optionally, wherein the at least one detection criterion comprises a power detection criterion corresponding to a detected signal power when the one or more RF components are at the on-state, wherein switching the one or more RF components from the on-state to the off-state comprises switching the one or more RF components from the on-state to the off-state based on determination that the detected signal power is not greater than a power threshold.

Example 55 includes the subject matter of Example 54, and optionally, wherein the instructions, when executed, cause the receiver to detect a pre-filtering signal power prior to a channel filter of the receiver when the one or more RF components are at the on-state, and to switch the one or more RF components from the on-state to the off-state based on determination that the pre-filtering signal power is not greater than a pre-filtering power threshold.

Example 56 includes the subject matter of Example 54 or 55, and optionally, wherein the instructions, when executed, cause the receiver to detect a post-filtering signal power after a channel filter of the receiver when the one or more RF components are at the on-state, and to switch the one or more RF components from the on-state to the off-state based on determination that the post-filtering signal power is not greater than a post-filtering power threshold.

Example 57 includes the subject matter of Example 55 or 56, and optionally, wherein the channel filter comprises a primary channel filter to filter a wireless communication primary channel for reception of wireless communication signals at the receiver.

Example 58 includes the subject matter of any one of Examples 53-57, and optionally, wherein the at least one detection criterion comprises a preamble detection criterion corresponding to a result of the preamble detection by the preamble detector.

Example 59 includes the subject matter of any one of Examples 53-58, and optionally, wherein the instructions, when executed, cause the receiver to detect a pre-filtering signal power prior to a channel filter of the receiver when the one or more RF components are at the on-state; when the pre-filtering signal power is not greater than a pre-filtering power threshold, switch the one or more RF components from the on-state to the off-state; when the pre-filtering signal power is greater than the pre-filtering power threshold, detect a post-filtering signal power after the channel filter when the one or more RF components are at the on-state; when the post-filtering signal power is not greater than a post-filtering power threshold, switch the one or more RF components from the on-state to the off-state; and when the post-filtering signal power is greater than the post-filtering power threshold, maintain the one or more RF components at the on-state at least until a result of the preamble detection by the preamble detector.

Example 60 includes the subject matter of any one of Examples 53-59, and optionally, wherein the one or more RF components comprise at least a Low Noise Amplifier (LNA), an Analog to Digital Converter (ADC), and one or more analog Baseband (BB) components.

Example 61 includes the subject matter of any one of Examples 53-60, and optionally, wherein the duration of the off-state period is based at least on a post-detection duration of one or more post-detection operations on the frame preamble.

Example 62 includes the subject matter of any one of Examples 53-61, and optionally, wherein the duration of the off-state period is based at least on a predefined minimal duration of a portion of the frame preamble for the preamble detection by the preamble detector.

Example 63 includes the subject matter of any one of Examples 53-62, and optionally, wherein the preamble detection comprises an Orthogonal-Frequency-Division-Multiplexing (OFDM) preamble detection.

Example 64 includes the subject matter of Example 63, and optionally, wherein the instructions, when executed, cause the receiver to perform Direct Current (DC) estimation in parallel to buffering a Short Training Field (STF) for the OFDM preamble detection.

Example 65 includes the subject matter of Example 63 or 64, and optionally, wherein the instructions, when executed, cause the receiver to perform the OFDM preamble detection based on a Short Training Field (STF), and to allow a symbol timing detection based on at least part of a Long Training Field (LTF) subsequent to the STF.

Example 66 includes the subject matter of any one of Examples 53-62, and optionally, wherein the preamble detection comprises a Complementary Code Keying (CCK) preamble detection.

Example 67 includes the subject matter of Example 66, and optionally, wherein the instructions, when executed, cause the receiver to switch the one or more RF components to the off-state based on a determination that a partial CCK preamble processing does not indicate the CCK preamble detection.

Example 68 includes the subject matter of any one of Examples 53-67, and optionally, wherein the instructions, when executed, maintain at least an RF local oscillator of the receiver operative when the one or more RF components are at the off-state.

Example 69 includes the subject matter of any one of Examples 53-68, and optionally, wherein the instructions, when executed, cause the receiver to switch the one or more RF components between the on-state and the off-state during a Receive (Rx) listening state.

Example 70 includes an apparatus of wireless communication by a wireless communication receiver, the apparatus comprising means for switching one or more Radio Frequency (RF) components of the receiver between an on-state and an off-state based on at least one detection criterion for preamble detection of a frame preamble by a preamble detector of the receiver, switching the one or more RF components between the on-state and the off-state comprising switching the one or more RF components from the on-state to the off-state based on determination that the at least one detection criterion is not met, and switching the one or more RF components from the off-state to the on-state after an off-state period, wherein a duration of the off-state period is based at least on a preamble duration of the frame preamble and a detection duration of the preamble detection by the preamble detector; and means for repeating switching the one or more RF components between the on-state and the off-state until the frame preamble is detected by the preamble detector.

Example 71 includes the subject matter of Example 70, and optionally, wherein the at least one detection criterion comprises a power detection criterion corresponding to a detected signal power when the one or more RF components are at the on-state, wherein switching the one or more RF components from the on-state to the off-state comprises switching the one or more RF components from the on-state to the off-state based on determination that the detected signal power is not greater than a power threshold.

Example 72 includes the subject matter of Example 71, and optionally, comprising means for detecting a pre-filtering signal power prior to a channel filter of the receiver when the one or more RF components are at the on-state, and switching the one or more RF components from the on-state to the off-state based on determination that the pre-filtering signal power is not greater than a pre-filtering power threshold.

Example 73 includes the subject matter of Example 71 or 72, and optionally, comprising means for detecting a post-filtering signal power after a channel filter of the receiver when the one or more RF components are at the on-state, and switching the one or more RF components from the on-state to the off-state based on determination that the post-filtering signal power is not greater than a post-filtering power threshold.

Example 74 includes the subject matter of Example 72 or 73, and optionally, wherein the channel filter comprises a primary channel filter to filter a wireless communication primary channel for reception of wireless communication signals at the receiver.

Example 75 includes the subject matter of any one of Examples 70-74, and optionally, wherein the at least one detection criterion comprises a preamble detection criterion corresponding to a result of the preamble detection by the preamble detector.

Example 76 includes the subject matter of any one of Examples 70-75, and optionally, comprising means for detecting a pre-filtering signal power prior to a channel filter of the receiver when the one or more RF components are at the on-state; means for, when the pre-filtering signal power is not greater than a pre-filtering power threshold, switching the one or more RF components from the on-state to the off-state; means for, when the pre-filtering signal power is greater than the pre-filtering power threshold, detecting a post-filtering signal power after the channel filter when the one or more RF components are at the on-state; means for, when the post-filtering signal power is not greater than a post-filtering power threshold, switching the one or more RF components from the on-state to the off-state; and means for, when the post-filtering signal power is greater than the post-filtering power threshold, maintaining the one or more RF components at the on-state at least until a result of the preamble detection by the preamble detector.

Example 77 includes the subject matter of any one of Examples 70-76, and optionally, wherein the one or more RF components comprise at least a Low Noise Amplifier (LNA), an Analog to Digital Converter (ADC), and one or more analog Baseband (BB) components.

Example 78 includes the subject matter of any one of Examples 70-77, and optionally, wherein the duration of the off-state period is based at least on a post-detection duration of one or more post-detection operations on the frame preamble.

Example 79 includes the subject matter of any one of Examples 70-78, and optionally, wherein the duration of the off-state period is based at least on a predefined minimal duration of a portion of the frame preamble for the preamble detection by the preamble detector.

Example 80 includes the subject matter of any one of Examples 70-79, and optionally, wherein the preamble detection comprises an Orthogonal-Frequency-Division-Multiplexing (OFDM) preamble detection.

Example 81 includes the subject matter of Example 80, and optionally, comprising means for performing Direct Current (DC) estimation in parallel to buffering a Short Training Field (STF) for the OFDM preamble detection.

Example 82 includes the subject matter of Example 80 or 81, and optionally, comprising means for performing the OFDM preamble detection based on a Short Training Field (STF), and allowing a symbol timing detection based on at least part of a Long Training Field (LTF) subsequent to the STF.

Example 83 includes the subject matter of any one of Examples 70-79, and optionally, wherein the preamble detection comprises a Complementary Code Keying (CCK) preamble detection.

Example 84 includes the subject matter of Example 83, and optionally, comprising means for switching the one or more RF components to the off-state based on a determination that a partial CCK preamble processing does not indicate the CCK preamble detection.

Example 85 includes the subject matter of any one of Examples 70-84, and optionally, comprising means for maintaining at least an RF local oscillator of the receiver operative when the one or more RF components are at the off-state.

Example 86 includes the subject matter of any one of Examples 70-85, and optionally, comprising means for switching the one or more RF components between the on-state and the off-state during a Receive (Rx) listening state.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless communication receiver to:

during a Receive (Rx) listening state, switch one or more Radio Frequency (RF) components of the receiver between an on-state and an off-state based on at least one detection criterion for preamble detection of a frame preamble by a preamble detector of the receiver, wherein the one or more RF components comprise at least one of a Low Noise Amplifier (LNA) or an analog Baseband (BB) component, wherein switching the one or more RF components between the on-state and the off-state, comprises switching the one or more RF components from the on-state to the off-state based on determination that the at least one detection criterion is not met, and switching the one or more RF components from the off-state to the on-state after an off-state period, wherein a duration of the off-state period is based at least on a preamble duration of the frame preamble and a detection duration of the preamble detection by the preamble detector; and repeat switching the one or more RF components between the on-state and the off-state until the frame preamble is detected by the preamble detector.

2. The apparatus of claim 1, wherein the at least one detection criterion comprises a power detection criterion corresponding to a detected signal power when the one or more RF components are at the on-state, wherein switching the one or more RF components from the on-state to the off-state comprises switching the one or more RF components from the on-state to the off-state based on determination that the detected signal power is not greater than a power threshold.

3. The apparatus of claim 2 configured to cause the receiver to detect a pre-filtering signal power prior to a channel filter of the receiver when the one or more RF components are at the on-state, and to switch the one or more RF components from the on-state to the off-state based on determination that the pre-filtering signal power is not greater than a pre-filtering power threshold.

4. The apparatus of claim 2 configured to cause the receiver to detect a post-filtering signal power after a channel filter of the receiver when the one or more RF components are at the on-state, and to switch the one or more RF components from the on-state to the off-state based on determination that the post-filtering signal power is not greater than a post-filtering power threshold.

5. The apparatus of claim 4, wherein the channel filter comprises a primary channel filter to filter a wireless communication primary channel for reception of wireless communication signals at the receiver.

6. The apparatus of claim 1, wherein the at least one detection criterion comprises a preamble detection criterion corresponding to a result of the preamble detection by the preamble detector.

7. The apparatus of claim 1 configured to cause the receiver to:
   detect a pre-filtering signal power prior to a channel filter of the receiver when the one or more RF components are at the on-state;
   when the pre-filtering signal power is not greater than a pre-filtering power threshold, switch the one or more RF components from the on-state to the off-state;
   when the pre-filtering signal power is greater than the pre-filtering power threshold, detect a post-filtering signal power after the channel filter when the one or more RF components are at the on-state;
   when the post-filtering signal power is not greater than a post-filtering power threshold, switch the one or more RF components from the on-state to the off-state; and
   when the post-filtering signal power is greater than the post-filtering power threshold, maintain the one or more RF components at the on-state at least until a result of the preamble detection by the preamble detector.

8. The apparatus of claim 1, wherein the one or more RF components comprise at least the LISA, an Analog to Digital Converter (ADC), and one or more analog BB components.

9. The apparatus of claim 1, wherein the duration of the off-state period is based at least on a post-detection duration of one or more post-detection operations on the frame preamble.

10. The apparatus of claim 1, wherein the duration of the off-state period is based at least on a predefined minimal duration of a portion of the frame preamble for the preamble detection by the preamble detector.

11. The apparatus of claim 1, wherein the preamble detection comprises an Orthogonal-Frequency-Division-Multiplexing (OFDM) preamble detection.

12. The apparatus of claim 11 configured to cause the receiver to perform Direct Current (DC) estimation in parallel to buffering a Short Training Field (STF) for the OFDM preamble detection.

13. The apparatus of claim 11 configured to cause the receiver to perform the OFDM preamble detection based on a Short Training Field (STF), and to allow a symbol timing detection based on at least part of a Long Training Field (LTF) subsequent to the STF.

14. The apparatus of claim 1, wherein the preamble detection comprises a Complementary Code Keying (CCK) preamble detection.

15. The apparatus of claim 14 configured to cause the receiver to switch the one or more RF components to the off-state based on a determination that a partial CCK preamble processing does not indicate the CCK preamble detection.

16. The apparatus of claim 1 configured to cause the receiver to maintain at least an RF local oscillator of the receiver operative when the one or more RF components are at the off-state.

17. The apparatus of claim 1 comprising a digital RF controller to switch the one or more RF components between the on-state and the off-state during the Rx listening state.

18. The apparatus of claim 1 comprising a memory, a processor, and one or more antennas.

19. A product comprising one or more tangible computer-readable non-transitory storage media comprising computer-executable instructions operable to, when executed by at least one processor, enable the at least one processor to cause a wireless communication receiver to:
   during a Receive (Rx) listening state, switch one or more Radio Frequency (RF) components of the receiver between an on-state and an off-state based on at least one detection criterion for preamble detection of a frame preamble by a preamble detector of the receiver, wherein the one or more RF components comprise at least one of a Low Noise Amplifier (LNA) or an analog Baseband (BB) component, wherein switching the one or more RF components between the on-state and the off-state comprises switching the one or more RF components from the on-state to the off-state based on determination that the at least one detection criterion is not met, and switching the one or more RF components from the off-state to the on-state after an off-state period, wherein a duration of the off-state period is based at least on a preamble duration of the frame preamble and a detection duration of the preamble detection by the preamble detector; and
   repeat switching the one or more RF components between the on-state and the off-state until the frame preamble is detected by the preamble detector.

20. The product of claim 19, wherein the at least one detection criterion comprises a power detection criterion corresponding to a detected signal power when the one or more RF components are at the on-state, wherein switching the one or more RF components from the on-state to the off-state comprises switching the one or more RF components from the on-state to the off-state based on determination that the detected signal power is not greater than a power threshold.

21. The product of claim 19, wherein the at least one detection criterion comprises a preamble detection criterion corresponding to a result of the preamble detection by the preamble detector.

22. The product of claim 19, wherein the instructions, when executed, cause the receiver to:
   detect a pre-filtering signal power prior to a channel filter of the receiver when the one or more RF components are at the on-state;
   when the pre-filtering signal power is not greater than a pre-filtering power threshold, switch the one or more RF components from the on-state to the off-state;
   when the pre-filtering signal power is greater than the pre-filtering power threshold, detect a post-filtering signal power after the channel filter when the one or more RF components are at the on-state;
   when the post-filtering signal power is not greater than a post-filtering power threshold, switch the one or more RF components from the on-state to the off-state; and
   when the post-filtering signal power is greater than the post-filtering power threshold, maintain the one or more RF components at the on-state at least until a result of the preamble detection by the preamble detector.

23. The product of claim 19, wherein the one or more RF components comprise at least the LNA, an Analog to Digital Converter (ADC), and one or more analog BB components.

24. An apparatus of wireless communication by a wireless communication receiver, the apparatus comprising:
preamble detector means for preamble detection of a frame preamble; and
means for switching, during a Receive (Rx) listening state, one or more Radio Frequency (RF) components of the receiver between an on-state and an off-state based on at least one detection criterion for preamble detection of the frame preamble by the preamble the preamble detector means, wherein the one or more RF components comprise at least one of a Low Noise Amplifier (LNA) or an analog Baseband (BB) component, wherein switching the one or more RF components between the on-state and the off-state comprises switching the one or more RF components from the on-state to the off-state based on determination that the at least one detection criterion is not met, and switching the one or more RF components from the off-state to the on-state after an off-state period, wherein a duration of the off-state period is based at least on a preamble duration of the frame preamble and a detection duration of the preamble detection by the preamble detector means, wherein the means for switching comprises means for repeating switching the one or more RF components between the on-state and the off-state until the frame preamble is detected by the preamble detector means.

25. The apparatus of claim 24, wherein the at least one detection criterion comprises a power detection criterion corresponding to a detected signal power when the one or more RF components are at the on-state, wherein switching the one or more RF components from the on-state to the off-state comprises switching the one or more RF components from the on-state to the off-state based on determination that the detected signal power is not greater than a power threshold.

* * * * *

UNITED STATES PATENT AND TRADEMARK OFFICE
CERTIFICATE OF CORRECTION

PATENT NO. : 10,892,914 B2  
APPLICATION NO. : 16/233395  
DATED : January 12, 2021  
INVENTOR(S) : Assaf Gurevitz et al.

Page 1 of 1

It is certified that error appears in the above-identified patent and that said Letters Patent is hereby corrected as shown below:

In the Claims

In Column 39, Line 38, in Claim 8, delete "the LISA," and insert --the LNA,--, therefor In Column 41, Line 15, in Claim 24, delete "detection of the frame preamble by the preamble the" and insert --detection of the frame preamble by the--, therefor Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*